(12) United States Patent
Kim

(10) Patent No.: US 11,511,772 B2
(45) Date of Patent: Nov. 29, 2022

(54) NPU IMPLEMENTED FOR ARTIFICIAL NEURAL NETWORKS TO PROCESS FUSION OF HETEROGENEOUS DATA RECEIVED FROM HETEROGENEOUS SENSORS

(71) Applicant: DEEPX CO., LTD., Seongnam-si (KR)

(72) Inventor: Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 17/719,359

(22) Filed: Apr. 12, 2022

(65) Prior Publication Data
US 2022/0348229 A1 Nov. 3, 2022

(30) Foreign Application Priority Data

Apr. 30, 2021 (KR) .................. 10-2021-0056855
Mar. 4, 2022 (KR) .................. 10-2022-0027949

(51) Int. Cl.
*B60W 60/00* (2020.01)
*G05B 13/02* (2006.01)
(Continued)

(52) U.S. Cl.
CPC ........ *B60W 60/0015* (2020.02); *B60W 50/00* (2013.01); *G05B 13/027* (2013.01); *G06F 7/00* (2013.01); *G06F 9/28* (2013.01); *G06F 9/3004* (2013.01); *G06F 9/30069* (2013.01); *G06F 9/30079* (2013.01); *G06F 12/00* (2013.01);
(Continued)

(58) Field of Classification Search
CPC ............. B60W 60/0015; B60W 50/00; B60W 2420/403; B60W 2420/42; B60W 2420/52; G05B 13/027; G06F 7/00; G06F 9/28; G06F 9/3004; G06F 9/30069;
(Continued)

(56) References Cited

U.S. PATENT DOCUMENTS

| 10,019,668 | B1 | 7/2018 | Woo | |
| 2018/0284758 | A1* | 10/2018 | Cella | ...................... G06Q 30/02 |
| 2022/0126878 | A1* | 4/2022 | Moustafa | .......... B60W 60/0053 |

FOREIGN PATENT DOCUMENTS

| CN | 110135561 A | * | 8/2019 | .......... G06N 3/0454 |
| JP | 2018-092559 A | | 6/2018 | |

(Continued)

*Primary Examiner* — Henry Tsai
*Assistant Examiner* — John B Roche
(74) *Attorney, Agent, or Firm* — Invenstone Patent, LLC

(57) ABSTRACT

A neural processing unit (NPU) includes a controller including a scheduler, the controller configured to receive from a compiler a machine code of an artificial neural network (ANN) including a fusion ANN, the machine code including data locality information of the fusion ANN, and receive heterogeneous sensor data from a plurality of sensors corresponding to the fusion ANN; at least one processing element configured to perform fusion operations of the fusion ANN including a convolution operation and at least one special function operation; a special function unit (SFU) configured to perform a special function operation of the fusion ANN; and an on-chip memory configured to store operation data of the fusion ANN, wherein the schedular is configured to control the at least one processing element and the on-chip memory such that all operations of the fusion ANN are processed in a predetermined sequence according to the data locality information.

22 Claims, 34 Drawing Sheets

(51) Int. Cl.
    *B60W 50/00*     (2006.01)
    *G06F 9/30*     (2018.01)
    *G06T 1/20*     (2006.01)
    *G06N 3/02*     (2006.01)
    *G06F 7/00*     (2006.01)
    *G06F 12/00*     (2006.01)
    *G06F 9/28*     (2006.01)

(52) U.S. Cl.
    CPC ................. *G06N 3/02* (2013.01); *G06T 1/20* (2013.01); *B60W 2420/403* (2013.01); *B60W 2420/42* (2013.01); *B60W 2420/52* (2013.01)

(58) Field of Classification Search
    CPC ....... G06F 9/30079; G06F 12/00; G06N 3/02; G06T 1/20
    See application file for complete search history.

(56) References Cited

FOREIGN PATENT DOCUMENTS

| | | |
|---|---|---|
| KR | 10-2019-0043419 A | 4/2019 |
| KR | 10-2019-0112681 A | 10/2019 |
| KR | 10-2019-0118635 A | 10/2019 |
| KR | 10-2019-0136431 A | 12/2019 |
| KR | 10-2020-0057814 A | 5/2020 |
| KR | 10-2020-0075185 A | 6/2020 |
| KR | 10-2020-0129058 A | 11/2020 |

* cited by examiner

| Layer | Memory map Start address | Memory map end address | Operation mode | Data type | ANN DATA LOCALITY | DATA SIZE (Byte) |
|---|---|---|---|---|---|---|
| 1 | 0 | A=A' | Read | IFMAP | 1 | A |
| 1 | A'+1 | A'+1+B=B' | Read | Kernel | 2 | B |
| 1 | B'+1 | B'+1+C=C' | Write | OFMAP | 3 | C |
| 2 | B'+1 | B'+1+C=C' | Read | IFMAP | 4 | C |
| 2 | C'+1 | C'+1+D=D' | Read | Kernel | 5 | D |
| 2 | D'+1 | D'+1+E=E' | Write | OFMAP | 6 | E |
| 3 | D'+1 | D'+1+E=E' | Read | IFMAP | 7 | E |
| 3 | E'+1 | E'+1+F=F' | Read | Kernel | 8 | F |
| 3 | F'+1 | F'+1+G=G' | Write | OFMAP | 9 | G |
| 4 | F'+1 | F'+1+G=G' | Read | IFMAP | 10 | G |
| 4 | G'+1 | G'+1+H=H' | Read | Kernel | 11 | H |
| 4 | H'+1 | H'+1+I=I' | Write | OFMAP | 12 | I |
| 1 | B'+1 | B'+1+C=C' | Read | SKIP CONNECTION | 13 | C |
| 5 | H'+1 | H'+1+I=I' | Read | Kernel | 14 | I |
| 5 | I'+1 | I'+1+J=J' | Read | OFMAP | 15 | J |
| 5 | J'+1 | J'+1+K=K' | Write | IFMAP | 16 | K |

FIG. 16B

NPU IMPLEMENTED FOR ARTIFICIAL NEURAL NETWORKS TO PROCESS FUSION OF HETEROGENEOUS DATA RECEIVED FROM HETEROGENEOUS SENSORS

CROSS-REFERENCE TO RELATED APPLICATIONS

This application claims the priority of Korean Patent Application No. 10-2021-0056855 filed on Apr. 30, 2021 and Korean Patent Application No. 10-2022-0027949 filed on Mar. 4, 2022, in the Korean Intellectual Property Office, the disclosure of which is incorporated herein by reference.

BACKGROUND OF THE DISCLOSURE

Technical Field

The present disclosure relates to artificial neural networks, and more particularly, to a neural processing unit for an artificial neural network (ANN), which is implemented to process a fusion operation of heterogeneous data received from heterogeneous sensors.

Background Art

Humans are equipped with intelligence that can perform recognition, classification, inference, prediction, and control/decision making. Artificial intelligence (AI) refers to artificially mimicking human intelligence.

The human brain is made up of numerous nerve cells called neurons, and each neuron is connected to hundreds to thousands of other neurons through connections called synapses. In order to imitate human intelligence, the modeling of the operating principle of biological neurons and the connection relationship between neurons is called an artificial neural network (ANN) model. That is, an artificial neural network is a system that connects nodes that mimic neurons in a layer structure.

These ANN models are divided into "single-layer neural network" and "multi-layer neural network" according to the number of layers.

A general multi-layer neural network consists of an input layer, a hidden layer, and an output layer, wherein (1) the input layer is a layer that receives external data, and the number of neurons in the input layer is the same as the number of input variables, (2) the hidden layer is located between the input layer and the output layer, receives a signal from the input layer, extracts characteristics, and transmits it to the output layer, and (3) the output layer receives a signal from the hidden layer and outputs it to the outside. The input signal between neurons is multiplied by each connection strength with a value between zero and one and then summed. If this sum is greater than the neuron threshold, the neuron is activated and implemented as an output value through the activation function.

Meanwhile, in order to implement higher artificial intelligence, an increase in the number of hidden layers of an artificial neural network is called a deep neural network (DNN).

On the other hand, for autonomous driving of a vehicle, various sensors, for example, LiDAR (Light Detection and Ranging), radar, camera, GPS, ultrasonic sensor, NPU and the like, may be mounted on the vehicle. Since the data provided from such various sensors is large, there is a disadvantage in that processing time is considerably long.

Since a vast amount of data must be processed in substantially real time for autonomous driving, artificial neural networks are emerging as a solution recently.

However, implementing a dedicated artificial neural network for each of a plural set of heterogeneous sensor data may be very inefficient.

SUMMARY OF THE DISCLOSURE

Accordingly, the inventor of the present disclosure has researched a neural processing unit (NPU) for effectively processing different data provided from heterogeneous sensors through a fusion neural network.

According to an example of the present disclosure, a neural processing unit (NPU) may be provided. The NPU may include a controller including a scheduler, the controller configured to receive from a compiler a machine code of an artificial neural network (ANN) including a fusion ANN, the machine code including data locality information of the fusion ANN, and receive heterogeneous sensor data from a plurality of sensors corresponding to the fusion ANN; at least one processing element configured to perform fusion operations of the fusion ANN including a convolution operation and at least one special function operation; and an on-chip memory configured to store operation data of the fusion ANN. The schedular may be configured to control the at least one processing element and the on-chip memory such that all operations of the fusion ANN are processed in a predetermined sequence according to the data locality information.

According to another example of the present disclosure, a neural processing unit (NPU) may be provided. The NPU may include a controller configured to receive a machine code of an artificial neural network (ANN) including a fusion ANN, the machine code including data locality information of the fusion ANN; at least one processing element configured to perform computation of the fusion ANN based on the machine code; and a special function unit (SFU) including a plurality of function units, the SFU configured to compute a special function corresponding to one of the plurality of function units by receiving a convolution operation value processed by the at least one processing element. The SFU may be further configured to selectively control at least one of the pluralities of function units according to the data locality information.

According to another example of the present disclosure, a system may be provided. The system may include at least one neural processing unit and a memory controller including a memory. The at least one neural processing unit may include a controller configured to receive a machine code of an artificial neural network (ANN) including a fusion ANN, the machine code including data locality information of the fusion ANN; an input unit configured to receive at least two input signals; at least one processing element configured to perform a convolution operation; and an on-chip memory configured to store a result of the convolution operation. The memory controller including the memory may be configured to receive the data locality information of the fusion ANN for predicting successive memory operation requests of the at least one neural processing unit, and to cache a next memory operation request to be requested by a corresponding one of the at least one neural processing unit based on the data locality information.

According to the present disclosure, by utilizing the NPU, the performance of a fusion artificial neural network for processing different data provided from heterogeneous sensors can be improved.

According to the present disclosure, through a concatenation operation and a skip-connection operation, the fusion artificial neural network can effectively process heterogeneous data provided from heterogeneous sensors. For said operations, the NPU may include a special function unit (SFU) to which a plurality of function units is connected by a pipeline, wherein the plurality of function units is selectively turned off, thereby reducing power consumption.

According to an example of the present disclosure, a traffic sign can be effectively detected by turning on and turning off a near-infrared (NIR) light source and then detecting, through an NIR sensor, the NIR light reflected from signs having a retro-reflector characteristic.

The effects according to the present disclosure are not limited to the contents exemplified above, and more various effects are included in the present specification.

BRIEF DESCRIPTION OF THE DRAWINGS

FIG. 16B is an exemplary diagram illustrating data of an artificial neural network locality information including skip-connection.

DETAILED DESCRIPTION OF THE EMBODIMENT

Figure 1:
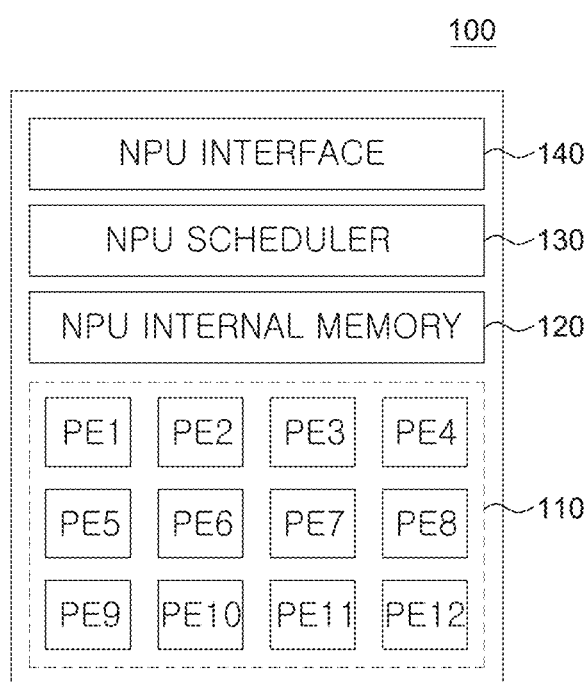
FIG. 1 is a schematic conceptual diagram illustrating a neural processing unit according to the present disclosure.

Particular structural or step-by-step descriptions for examples according to the concept of the present disclosure disclosed in the present specification or application are merely exemplified for the purpose of explaining the examples according to the concept of the present disclosure.

Examples according to the concept of the present disclosure may be embodied in various forms, and examples according to the concept of the present disclosure may be embodied in various forms, and should not be construed as being limited to the examples described in the present specification or application.

Since the examples according to the concept of the present disclosure may have various modifications and may have various forms, specific examples will be illustrated in the drawings and described in detail in the present specification or application. However, this is not intended to limit the examples according to the concept of the present disclosure with respect to the specific disclosure form, and should be understood to include all modifications, equivalents, and substitutes included in the spirit and scope of the present disclosure.

Terms such as first and/or second may be used to describe various elements, but the elements should not be limited by the terms. The above terms are only for the purpose of distinguishing one element from another element, for example, without departing from the scope according to the concept of the present disclosure, and a first element may be termed a second element, and similarly, a second element may also be termed a first element.

When an element is referred to as being "connected to" or "in contact with" another element, it is understood that the other element may be connected to or in contact with the other element, but other elements may be disposed therebetween. On the other hand, when it is mentioned that a certain element is "directly connected to" or "in direct contact with" another element, it should be understood that no other element is present therebetween. Other expressions describing the relationship between elements, such as "between" and "immediately between" or "adjacent to" and "directly adjacent to," etc., should be interpreted similarly.

Terms used in present disclosure are only used to describe specific examples, and may not be intended to limit the scope of other examples. The singular expression may include the plural expression unless the context clearly dictates otherwise. It should be understood that as used herein, terms such as "comprise" or "have" are intended to designate that the stated feature, number, step, action, component, part, or combination thereof exists, but it does not preclude the possibility of addition or existence of at least one other features or numbers, steps, operations, elements, parts, or combinations thereof.

Unless defined otherwise, all terms used herein, including technical or scientific terms, have the same meaning as commonly understood by one of ordinary skill in the art to which this disclosure pertains. Terms such as those defined in a commonly used dictionary should be interpreted as having a meaning consistent with the meaning in the context of a related art, and should not be interpreted in an ideal or excessively formal meaning unless explicitly defined in the present specification.

In describing the embodiments, descriptions of technical contents that are well known in the technical field to which the present disclosure pertains and are not directly related to the present disclosure may be omitted. This is to more clearly convey the gist of the present disclosure without obscuring the gist of the present disclosure by omitting unnecessary description.

Definition of Terms

Hereinafter, in order to facilitate understanding of the disclosures presented in the present specification, terms used in the present specification will be briefly summarized.

NPU: an abbreviation of neural processing unit, which may refer to a processor specialized for computation of an ANN model separately from a central processing unit (CPU).

ANN: an abbreviation of artificial neural network. It may refer to a network in which nodes are connected in a layer structure to imitate human intelligence by mimicking those neurons in the human brain are connected through synapse.

For example, the artificial neural network model can be a model such as Bisenet, Shelfnet, Alexnet, Densenet, Efficientnet, EfficientDet, Googlenet, Mnasnet, Mobilenet, Resnet, Shufflenet, Squeezenet, VGG, Yolo, RNN, CNN, DBN, RBM, LSTM, and the like. However, the present disclosure is not limited thereto, and a novel artificial neural network model to operate in the NPU 100 has been continuously released.

ANN information: information including network structure information, information on the number of layers, connection relationship information of each layer, weight information of each layer, information on calculation processing methods, activation function information, and the like.

Information on ANN structure: information including information on the number of layers, the number of nodes in a layer, the value of each node, information on an operation processing method, information on a weight kernel applied to each node, and the like.

Information on ANN data locality: information that allows the neural processing unit to predict the operation sequence of the ANN model processed by the neural processing unit based on a data access request sent to a separate memory.

DNN: an abbreviation of deep neural network, which may mean that the number of hidden layers of the artificial neural network is increased in order to implement higher artificial intelligence.

CNN: an abbreviation for convolutional neural network, which is a neural network that functions similar to image processing in the visual cortex of the human brain. Convolutional neural networks are known to be suitable for image processing, and are known to be superior to extract features from input data and identify patterns of features.

Kernel: the weight value of an N×M matrix for convolution. Each layer of the ANN model has a plurality of kernels, and the number of kernels may be referred to as the number of channels or the number of filters.

Off-chip memory: memory disposed outside the chip to store large-capacity data, since memory size may be limited inside the NPU. The off-chip memory may include one of ROM, SRAM, DRAM, resistive RAM, magneto-resistive RAM, phase-change RAM, ferroelectric RAM, flash memory, high bandwidth memory (HBM), and the like. The off-chip memory may include at least one memory unit and may be configured as a homogeneous memory unit or a heterogeneous memory unit.

On-chip memory: memory included in the NPU, which may include volatile memory and/or non-volatile memory. For example, the on-chip memory may include one of ROM, SRAM, DRAM, resistive RAM, magneto-resistive RAM, phase-change RAM, ferroelectric RAM, flash memory, high bandwidth memory (HBM), and the like. The on-chip memory may include at least one memory unit and may be configured as a homogeneous memory unit or a heterogeneous memory unit.

Hereinafter, examples of the present disclosure will be described with reference to the accompanying drawings.

FIG. 1 illustrates a neural processing unit 100 according to the present disclosure.

The neural processing unit (NPU) 100 shown in FIG. 1 is a processor specialized to perform an operation for an artificial neural network.

An artificial neural network refers to a network of artificial neurons that multiplies and adds weights when multiple inputs or stimuli are received, and transforms and transmits the value added with an additional deviation through an activation function. A trained artificial neural network can be used to output inference results from input data.

The NPU 100 may be a semiconductor device implemented as an electric/electronic circuit. The electric/electronic circuit may include a number of electronic devices (e.g., a transistor and a capacitor). The NPU 100 may include a processing element (PE) array 110, an NPU internal memory 120, an NPU scheduler 130, and an NPU interface 140. Each of the array of processing elements 110, the NPU internal memory 120, the NPU scheduler 130, and the NPU interface 140 may be a semiconductor circuit to which numerous transistors are connected. Therefore, some transistors may be difficult or impossible to identify and distinguish with the naked eye, and may be identified only by functionality. For example, a specific circuit may operate as the array of processing elements 110 or may operate as the NPU scheduler 130. The NPU scheduler 130 may be configured to perform the function of a controller configured to control an ANN inference operation of the NPU 100.

The NPU internal memory 120 may be configured to store an ANN model that can be inferred by the array of processing elements 110, and the NPU scheduler 130 may be configured to control the array of processing elements 110 and the NPU internal memory 120 based on the data locality information or information about the structure of the ANN model. Here, the ANN model may include information on data locality information or structure of the artificial neural network model. The ANN model may refer to an AI recognition model trained to perform a specific inference function. The internal memory 120 may be implemented in a form of on-chip memory.

The array of processing elements 110 may perform an operation for an artificial neural network.

The NPU interface 140 may communicate with various elements, for example, a memory, connected to the NPU 100 through a system bus.

The NPU scheduler 130 may be configured to control the operation of the array of processing elements 110 for the inference operation of the neural processing unit 100 and the sequence of the read operation and the write operation of the NPU internal memory 120.

The NPU scheduler 130 may be configured to control the array of processing elements 110 and the NPU internal memory 120 based on the data locality information or information about the structure of the ANN model.

The NPU scheduler 130 may analyze the structure of the ANN model to be operated in the array of processing elements 100 or may receive pre-analyzed information. For example, the data of the artificial neural network that can be included in an ANN model may include at least a portion of node data (i.e., feature map) of each layer, arrangement data of layers, locality information or structure information, and weight data of each connection network (i.e., weight kernel) connecting nodes of each layer. The data of the artificial neural network may be stored in a memory provided inside the NPU scheduler 130 or the NPU internal memory 120.

The NPU scheduler 130 may schedule the operation sequence of the ANN model to be performed by the NPU 100 based on the data locality information or the structure information of the ANN model.

The NPU scheduler 130 may acquire a memory address value in which the feature map and weight data of the layer of the ANN model are stored based on the data locality information or the structure information of the ANN model. For example, the NPU scheduler 130 may obtain a memory address value in which the feature map and weight data of the layer of the ANN model stored in the memory are stored. Therefore, the NPU scheduler 130 may transmit the feature map and weight data of the layer of the ANN model to be driven from the memory 200 and store it in the NPU internal memory 120.

The feature map of each layer may have a corresponding memory address value, respectively.

Each weight data may have a corresponding memory address value, respectively.

The NPU scheduler 130 may schedule an operation sequence of the array of processing elements 110 based on the data locality information or the information about the structure of the ANN model, for example, the data locality information of layout of layers of the artificial neural network or the information about the structure of the ANN model.

The scheduling of operation sequences by the NPU scheduler 130 are based on the data locality information or the information about the structure of the artificial neural network model so that the NPU scheduler may operate in a different way from a scheduling concept of a normal CPU. The scheduling of the normal CPU operates to provide the highest efficiency in consideration of fairness, efficiency, stability, and reaction time. That is, the normal CPU schedules to perform the most processing during the same time in consideration of a priority and an operation time.

A conventional CPU uses an algorithm which schedules a task in consideration of data such as a priority or an operation processing time of each processing. In contrast, the NPU scheduler 130 may determine a processing sequence based on the data locality information or the information about the structure of the ANN model.

Moreover, the NPU scheduler 130 may operate the NPU 100 according to the determined processing sequence based on the data locality information or the information about the structure of the ANN model and/or data locality information or information of the NPU 100.

However, the present disclosure is not limited to the data locality information or the information about the structure of the NPU 100.

NPU scheduler 130 may be configured to store information about the data locality information or structure of the artificial neural network. That is, the NPU scheduler 130 may determine the processing sequence even if only information on the data locality information or structure of the artificial neural network of the ANN model is provided.

Furthermore, the NPU scheduler 130 may determine the processing sequence of the NPU 100 in consideration of the information on the data locality information or structure of the ANN model and the data locality information or information on the structure of the NPU 100. It is also possible to optimize the processing of the NPU 100 in the determined processing sequence.

The array of processing elements 110 may refer to a configuration in which a plurality of processing elements PE1 to PE12 configured to calculate the feature map and weight data of the artificial neural network are disposed. Each processing element may include a multiply and accumulate (MAC) operator and/or an arithmetic logic unit (ALU) operator. However, examples according to the present disclosure are not limited thereto.

Although FIG. 1 shows a plurality of processing elements, it is also possible to configure operators implemented as a plurality of multipliers and adder trees to be arranged in parallel by replacing the MAC in one processing element. In this case, the array of processing elements 110 may be referred to as at least one processing element including a plurality of operators. The MAC operation can be performed for performing the convolution operation.

According to the examples of the present disclosure, although FIGS. 1, 3, 15, 17, 18, 19, 21, and 24 show a plurality of processing elements, it is also possible to be implemented as at least one processing element.

The array of processing elements 110 is configured to include a plurality of processing elements PE1 to PE12. The plurality of processing elements PE1 to PE12 illustrated in FIG. 1 is merely an example for convenience of description, and the number of the plurality of processing elements PE1 to PE12 is not limited thereto. The size or number of the processing element array 110 may be determined by the number of the plurality of processing elements PE1 to PE12. The size of the processing element array 110 may be implemented in the form of an N×M matrix. Here, N and M are integers greater than zero. The processing element array 110 may include N×M processing elements. That is, there may be at least one processing element.

The size of the array of processing elements 110 may be designed in consideration of the characteristics of the ANN model in which the NPU 100 operates.

The array of processing elements 110 may be configured to perform functions such as addition, multiplication, and accumulation required for an artificial neural network operation. In other words, the array of processing elements 110 may be configured to perform a multiplication and accumulation (MAC) operation.

Hereinafter, the first processing element PE1 of the processing element array 110 will be described as an example.

Figure 2:
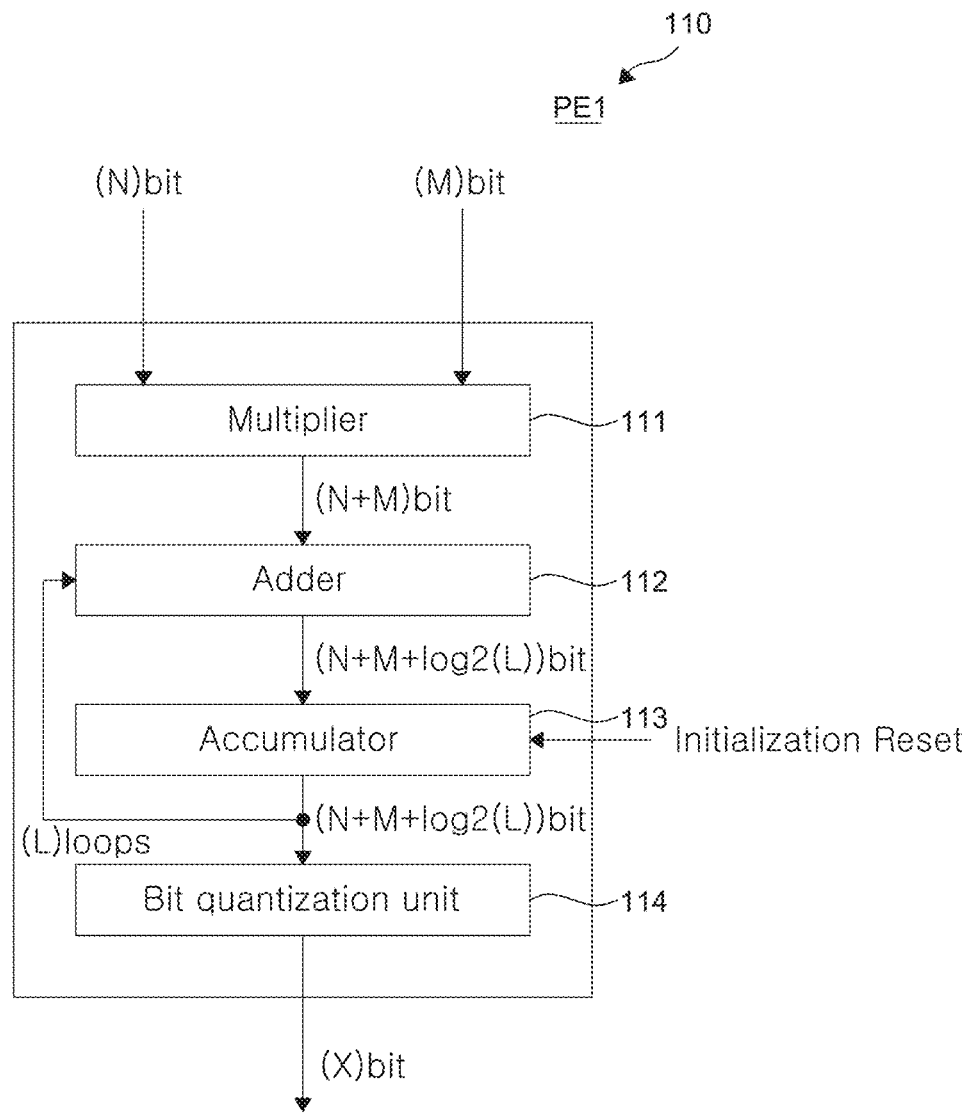
FIG. 2 is a schematic conceptual diagram illustrating one processing element of an array of processing elements that may be applied to the present disclosure.

FIG. 2 illustrates one processing element (e.g., PE1) of an array of processing elements that may be applied to the present disclosure.

The NPU 100 according to an example of the present disclosure may include an array of processing elements 110 configured to quantize and output a MAC operation result, an NPU internal memory 120 configured to store an ANN model that can be inferred from the array of processing elements 110 or to store at least some data of the ANN model, and an NPU scheduler 130 configured to control the array of processing elements 110 and the NPU internal memory 120 based on the ANN model structure data or the ANN data locality information. The NPU internal memory 120 may store all or part of the ANN model according to the memory size and the data size of the ANN model. However, examples of the present disclosure are not limited thereto.

Referring to FIG. 2, the first processing element PE1 may be configured to include a multiplier 111, an adder 112, an accumulator 113, and a bit quantization unit 114. However, examples according to the present disclosure are not limited thereto, and the array of processing elements 110 may be modified in consideration of the computational characteristics of the artificial neural network.

The multiplier 111 multiplies the received (N) bit data and (M) bit data. The operation value of the multiplier 111 is output as (N+M) bit data. The multiplier 111 may be configured to receive one variable and one constant.

The accumulator 113 may accumulate the operation value of the multiplier 111 and the operation value of the accumulator 113 by using the adder 112 for a number of L loops. Accordingly, the number of bits of data in the output unit and the input unit of the accumulator 113 may be output as (N+M+log 2(L)) bits, where L is an integer greater than zero.

When the accumulation is finished, the accumulator 113 may receive an initialization reset to initialize the data stored in the accumulator 113 to zero. However, examples according to the present disclosure are not limited thereto.

The bit quantization unit 114 may reduce the number of bits of data output from the accumulator 113. The bit quantization unit 114 may be controlled by the NPU scheduler 130. The number of bits of the quantized data may be output as X bits, where X is an integer greater than zero. According to the above configuration, the processing element array 110 is configured to perform a MAC operation, and the processing element array 110 has an effect of quantizing and outputting the MAC operation result. In particular, such quantization has the effect of further reducing power consumption as the number of L loops increases. In addition, if the power consumption is reduced, there is an effect that the heat generation of the edge device can also be reduced. In particular, reducing heat generation has an effect of reducing the possibility of malfunction due to high temperature of the neural processing unit 100.

The output data X bit of the bit quantization unit 114 may be node data of a next layer or input data of convolution. If the ANN model has been quantized, the bit quantization unit 114 may be configured to receive quantized information from the ANN model. However, it is not limited thereto, and the NPU scheduler 130 may be configured to extract quantized information by analyzing the ANN model. Therefore, the output data X bits may be converted into the quantized number of bits to correspond to the quantized data size and output. The output data X bit of the bit quantization unit 114 may be stored in the NPU internal memory 120 as the number of quantized bits.

Each processing element of the array of processing elements 110 of the NPU 100 according to an example of the present disclosure may include a multiplier 111, an adder 112, an accumulator 113, and a bit quantization unit 114.

Figure 3:
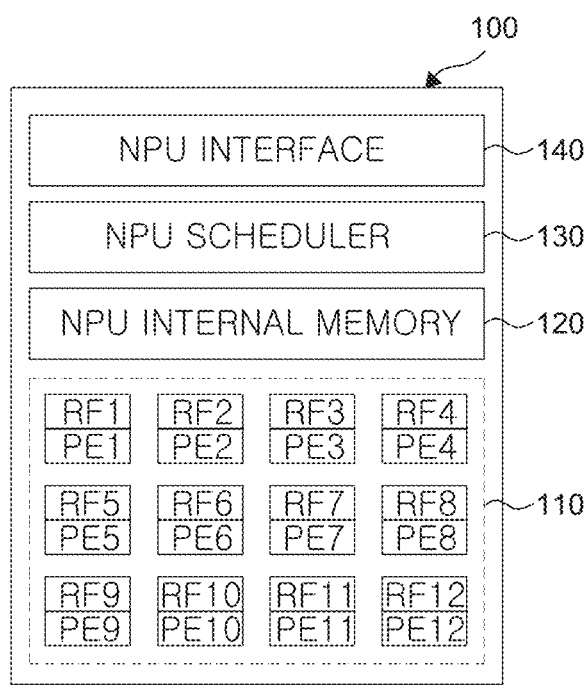
FIG. 3 is an exemplary view showing a modified example of the NPU shown in FIG. 1.

FIG. 3 shows a modified example of the NPU 100 shown in FIG. 1.

Since the NPU 100 illustrated in FIG. 3 is substantially the same as the NPU 100 exemplarily illustrated in FIG. 1, except for the array of processing elements array 110, hereinafter, redundant description will be omitted for convenience of description.

The array of processing elements 110 exemplarily illustrated in FIG. 3 may be configured to further include a plurality of processing elements PE1 to PE12 and respective register files RF1 to RF12 corresponding to each of the processing elements PE1 to PE12.

The plurality of processing elements PE1 to PE12 and the plurality of register files RF1 to RF12 as illustrated in FIG. 3 are merely examples for convenience of description, and the number of the plurality of processing elements PE1 to PE12 and the plurality of register files RF1 to RF12 is not limited thereto.

The size or number of the array of processing elements 110 may be determined by the number of the plurality of processing elements PE1 to PE12 and the plurality of register files RF1 to RF12. The size of the array of processing elements 110 and the plurality of register files RF1 to RF12 may be implemented in the form of an N×M matrix, where N and M are integers greater than zero.

The array size of the array of the processing elements 110 may be designed in consideration of the characteristics of the ANN model in which the NPU 100 operates. In other words, the memory size of the register file may be determined in consideration of the data size of the ANN model to be operated, the required operating speed, the required power consumption, and the like.

The register files RF1 to RF12 of the NPU 100 are static memory units directly connected to the processing elements PE1 to PE12. The register files RF1 to RF12 may include, for example, flip-flops and/or latches. The register files RF1 to RF12 may be configured to store MAC operation values of the corresponding processing elements RF1 to RF12. The register files RF1 to RF12 may be configured to provide or receive weight data and/or node data to the NPU internal memory 120.

It is also possible that the register files RF1 to RF12 are configured to perform a function of a temporary memory of the accumulator during MAC operation.

Figure 4:
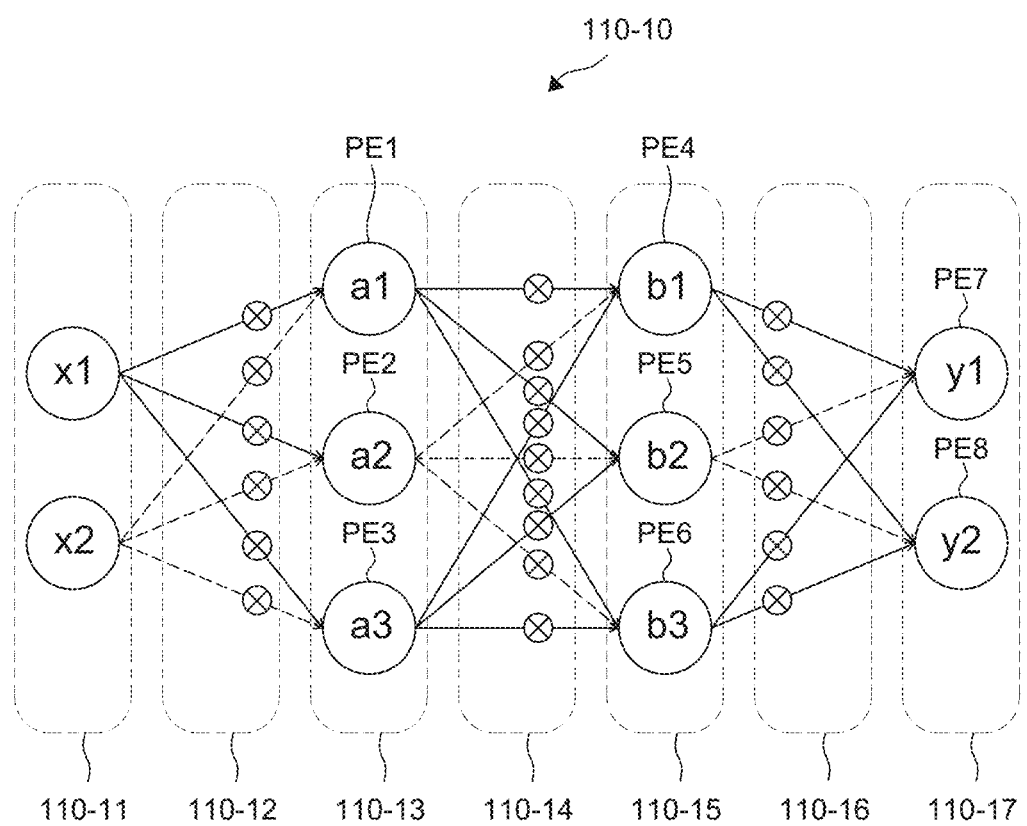
FIG. 4 is a schematic conceptual diagram illustrating an exemplary artificial neural network model.

FIG. 4 illustrates an exemplary artificial neural network (ANN) model 110-10.

Hereinafter, the operation of the exemplary ANN model 110-10 that can be operated in the NPU 100 will be described.

The exemplary ANN model 110-10 of FIG. 4 may be an artificial neural network trained by the NPU 100 or trained by the device illustrated in FIG. 1 or FIG. 3 or a separate machine learning device. The ANN model 110-10 may be an artificial neural network trained to perform various inference functions, such as object recognition and voice recognition.

The ANN model 110-10 may be a deep neural network (DNN). However, the ANN model 110-10 according to examples of the present disclosure is not limited to a deep neural network.

For example, the ANN model may be a model to be trained to perform inference such as object detection, object segmentation, image/video reconstruction, image/video enhancement, object tracking, event recognition, event prediction, anomaly detection, density estimation, event search, measurement, and the like.

For example, the ANN model can be a model such as Bisenet, Shelfnet, Alexnet, Densenet, Efficientnet, EfficientDet, Googlenet, Mnasnet, Mobilenet, Resnet, Shufflenet, Squeezenet, VGG, Yolo, RNN, CNN, DBN, RBM, LSTM, and the like. However, the present disclosure is not limited thereto, and novel ANN network models to operate in the NPU 100 have been continuously released.

However, the present disclosure is not limited to the above-described models. Also, the ANN model 110-10 may be an ensemble model based on at least two different models.

The ANN model 110-10 may be stored in the NPU internal memory 120 of the NPU 100.

Hereinafter, a process in which an exemplary ANN model 110-10 is inferred by the NPU 100 will be described with reference to FIG. 4.

The ANN model 110-10 is an exemplary DNN model configured to include an input layer 110-11, a first connection network 110-12, a first hidden layer 110-13, a second connection network 110-14, a second hidden layer 110-15, a third connection network 110-16, and an output layer 110-17. However, the present disclosure is not limited to the ANN model illustrated in FIG. 4. The first hidden layer 110-13 and the second hidden layer 110-15 may be referred to as a plurality of hidden layers.

The input layer 110-11 may include, for example, x1 and x2 input nodes. That is, the input layer 110-11 may include node data including two node values. The NPU scheduler 130 illustrated in FIG. 1 or FIG. 3 may set a memory address in which the input data of the input layer 110-11 is stored in the NPU internal memory 120 illustrated in FIG. 1 or FIG. 3.

The first connection network 110-12 may include, for example, connections having weight value including six weight values connecting each node of the input layer 110-11 and each node of the first hidden layer 110-13. The NPU scheduler 130 illustrated in FIG. 1 or FIG. 3 may set a memory address in which the weight value of the first connection network 110-12 is stored in the NPU internal memory 120. Each weight value is multiplied with each input node value, and an accumulated value of the multiplied values is stored in the first hidden layer 110-13. Here, the nodes may be referred to as the feature map.

The first hidden layer 110-13 may include, for example, nodes a1, a2, and a3. That is, the first hidden layer 110-13 may include node data including three node values. The NPU scheduler 130 illustrated in FIG. 1 or FIG. 3 may set a memory address in which the node value of the first hidden layer 110-13 is stored in the NPU internal memory 120.

The NPU scheduler 130 may be configured to schedule an operation sequence so that the first processing element PE1 performs the MAC operation of the a1 node of the first hidden layer 110-13. The NPU scheduler 130 may be configured to schedule the operation sequence so that the second processing element PE2 performs the MAC operation of the a2 node of the first hidden layer 110-13. The NPU scheduler 130 may be configured to schedule an operation sequence so that the third processing element PE3 performs the MAC operation of the a3 node of the first hidden layer 110-13. Here, the NPU scheduler 130 may pre-schedule the operation sequence so that the three processing elements perform each MAC operation simultaneously in parallel.

The second connection network 110-14 may include, for example, connections having a weight value including nine weight values connecting each node of the first hidden layer 110-13 and each node of the second hidden layer 110-15. The NPU scheduler 130 illustrated in FIG. 1 or FIG. 3 may set a memory address in which the weight value of the second connection network 110-14 is stored in the NPU internal memory 120. The weight value of the second connection network 110-14 is multiplied by the input node value of the first hidden layer 110-13, respectively, and the accumulated value of the multiplied values is stored in the second hidden layer 110-15.

The second hidden layer 110-15 may include, for example, nodes b1, b2, and b3. That is, the second hidden layer 110-15 may include information with respect to the three node values. The NPU scheduler 130 may set a memory address for storing information on node value of the second hidden layer 110-15 in the NPU internal memory 120.

The NPU scheduler 130 may be configured to schedule an operation sequence so that the fourth processing element PE4 performs the MAC operation of the b1 node of the second hidden layer 110-15. The NPU scheduler 130 may be configured to schedule an operation sequence so that the fifth processing element PE5 performs the MAC operation of the b2 node of the second hidden layer 110-15. The NPU scheduler 130 may be configured to schedule an operation sequence so that the sixth processing element PE6 performs the MAC operation of the b3 node of the second hidden layer 110-15.

Here, the NPU scheduler 130 may pre-schedule the operation sequence so that the three processing elements perform each MAC operation simultaneously in parallel.

Here, the NPU scheduler 130 may determine scheduling so that the operation of the second hidden layer 110-15 will be performed after the MAC operation of the first hidden layer 110-13 of the ANN model.

That is, the NPU scheduler 130 may be configured to control the array of processing elements 100 and the NPU internal memory 120 based on the data locality information or structure information of the ANN model.

The third connection network 110-16 may include, for example, information on six weight values connecting each node of the second hidden layer 110-15 and each node of the output layer 110-17. The NPU scheduler 130 may set a memory address for storing the weight value of the third connection network 110-16 in the NPU internal memory 120. Weight value of the third connection network 110-16 is multiplied by the input node value of the second hidden layer 110-15, and the accumulated value of the multiplied values is stored in the output layer 110-17.

The output layer 110-17 may include, for example, y1 and y2 nodes. That is, the output layer 110-17 may include information with respect to the two node values. The NPU scheduler 130 may set a memory address for storing information on the node value of the output layer 110-17 in the NPU internal memory 120.

The NPU scheduler 130 may be configured to schedule the operation sequence so that the seventh processing element PE7 performs the MAC operation of the y1 node of the output layer 110-17. The NPU scheduler 130 may be configured to schedule the operation sequence so that the eighth processing element PE8 performs the MAC operation of the y2 node of the output layer 110-15.

Here, the NPU scheduler 130 may pre-schedule the operation sequence so that the two processing elements perform each MAC operation simultaneously in parallel.

Here, the NPU scheduler 130 may determine the scheduling so that the operation of the output layer 110-17 will be performed after the MAC operation of the second hidden layer 110-15 of the ANN model.

That is, the NPU scheduler 130 may be configured to control the array of processing elements 100 and the NPU internal memory 120 based on the data locality information or structure information of the ANN model.

That is, the NPU scheduler 130 may analyze or receive the structure of an ANN model to operate in the array of processing elements 110. The ANN data that the ANN model can include may include node value of each layer, information on the locality information or structure of the layout data of the layers or information on the weight value of each network connecting the nodes of each layer.

As the NPU scheduler 130 is provided with structure data or ANN data locality information of the exemplary ANN model 110-10, the NPU scheduler 130 is also capable of analyzing the operation sequence from the input to the output of the ANN model 110-10.

Accordingly, the NPU scheduler 130 may set the memory address in which the MAC operation values of each layer are stored in the NPU internal memory 120 in consideration of the scheduling sequence.

The NPU internal memory 120 may be configured to preserve the weight data of the connections stored in the NPU internal memory 120 while the inference operation of the NPU 100 is continued. Accordingly, there is an effect of reducing a number of memory read/write operations.

That is, the NPU internal memory 120 may be configured to reuse the MAC operation value stored in the NPU internal memory 120 while the inference operation is continued.

Figure 5:
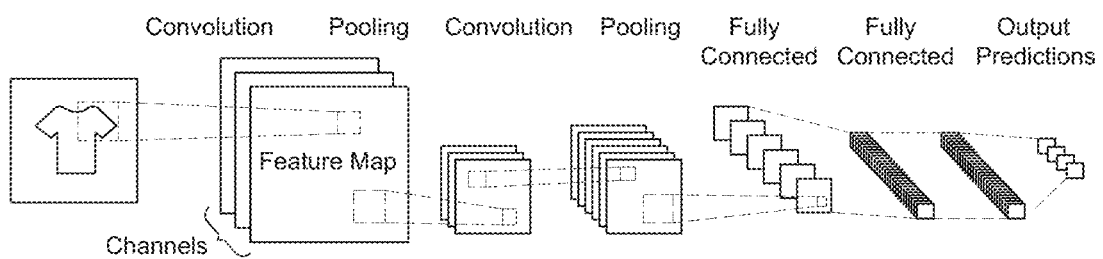
FIG. 5 is a diagram for explaining the basic structure of a convolutional neural network.

FIG. 5 is a diagram for explaining the basic structure of a convolutional neural network.

Referring to FIG. 5, a convolutional neural network may be a combination of at least one convolutional layer, a pooling layer, and a fully connected layer. The convolutional neural network has a structure suitable for learning and inference of two-dimensional data, and can be trained through a backpropagation algorithm.

In the example of the present disclosure, in the convolutional neural network, a kernel for extracting features of an input image of a channel for each channel may be provided. The kernel may be composed of a two-dimensional matrix, and convolution operation may be performed while traversing input data. The size of the kernel may be arbitrarily determined, and the stride at which the kernel traverses input data may also be arbitrarily determined. A result of convolution of all input data per kernel may be referred to as a feature map or an activation map. Hereinafter, the kernel may include a set of weight values or a plurality of sets of weight values. The number of kernels for each layer may be referred to as the number of channels.

As such, since the convolution operation is an operation performed by convolving input data and a kernel, an activation function for adding non-linearity may be applied thereafter. When an activation function is applied to a feature map that is a result of a convolution operation, it may be referred to as an activation map.

Specifically, referring to FIG. 5, the convolutional neural network may include at least one convolutional layer, at least one pooling layer, and at least one fully connected layer.

For example, convolution may be defined by two main parameters: the size of the input data (typically a 1×1, 3×3 or 5×5 matrix) and the depth of the output feature map (the number of kernels). These key parameters can be computed by convolution operation. These convolution operations may start at depth 32, continue to depth 64, and end at depth 128 or 256. The convolution operation may refer to an operation of sliding a kernel having a size of 3×3 or 5×5 over an input image matrix that is input data, multiplying each weight of the kernel and each element of the overlapping input image matrix, and then accumulating all of the multiplied values.

An activation function may be applied to the output feature map generated in this way to finally output an activation map. In addition, the weight used in the current layer may be transmitted to the next layer through convolution. The pooling layer may perform a pooling operation to reduce the size of the feature map by down sampling the output data (i.e., the activation map). For example, the pooling operation may include, but is not limited to, max pooling and/or average pooling.

The max pooling operation uses the kernel, and outputs the maximum value in the area of the feature map overlapping the kernel by sliding the feature map and the kernel. The average pooling operation outputs an average value within the area of the feature map overlapping the kernel by sliding the feature map and the kernel. As such, since the size of the feature map is reduced by the pooling operation, the number of weights of the feature map is also reduced.

The fully connected layer may classify data output through the pooling layer into a plurality of classes (i.e., inferenced result) and may output the classified class and a score thereof. Data output through the pooling layer may form a three-dimensional feature map, and this three-dimensional feature map can be converted into a one-dimensional vector and input as a fully connected layer.

Figure 6:
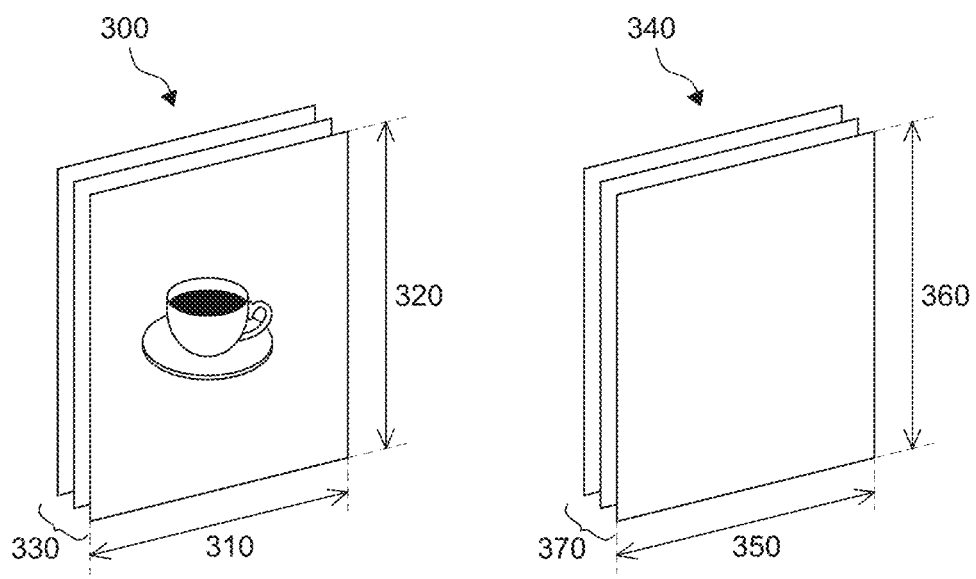
FIG. 6 is a diagram for explaining input data of a convolution layer and a kernel used for a convolution operation.

FIG. 6 is a diagram for explaining input data of a convolution layer and a kernel used for a convolution operation.

The input data 300 may be an image displayed as a two-dimensional matrix composed of rows 310 of a specific size and columns 320 of a specific size. The input data 300 may be referred to as a feature map. The input data 300 may have a plurality of channels 330, where the channel 330 may represent a color RGB channel of the input data image.

Meanwhile, the kernel 340 may be a weight parameter used for convolution for extracting features of a certain portion of the input data 300 while traversing it. Like the input data image, the kernel 340 may be configured to have a specific size of rows 350, a specific size of columns 360, and a specific number of channels 370. In general, the size of the row 350 and the column 360 of the kernel 340 is set to be the same, and the number of channels 370 may be the same as the number of channels 330 of the input data image.

Figure 7:
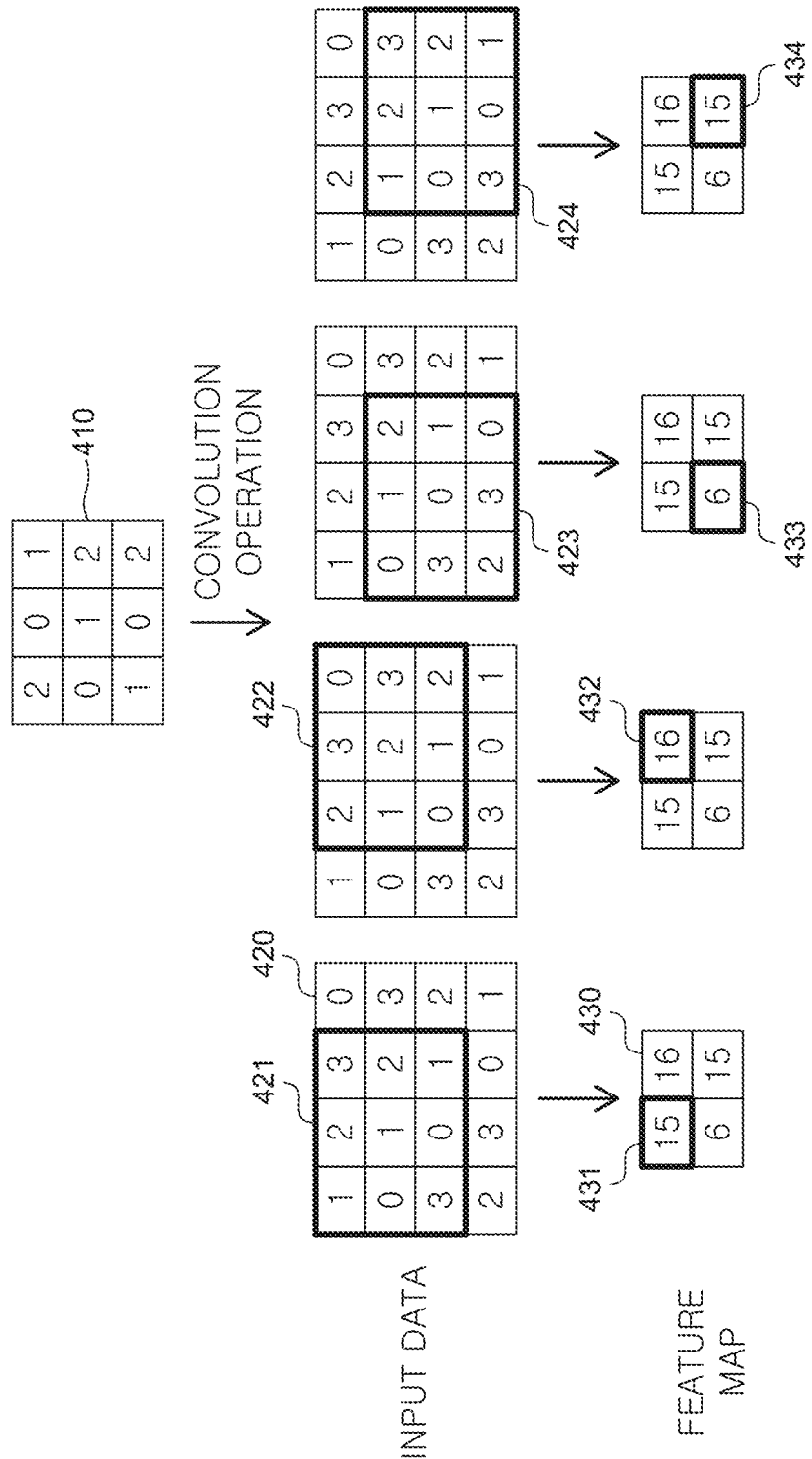
FIG. 7 is a diagram for explaining an operation of a convolutional neural network that generates an activation map using a kernel.

FIG. 7 is a diagram for explaining an operation of a convolutional neural network that generates an activation map using a kernel.

The kernel 410 may generate the feature map 430 by traversing the input data 420 at specified intervals and performing convolution. When the kernel 410 is applied to a portion of the input data 420, convolution may be performed by multiplying input data values at a specific position of a portion and values at the corresponding position in the kernel 410, and then adding all the generated values.

Through this convolution process, calculated values of the feature map are generated, and whenever the kernel 410 traverses the input data 420, the result values of the convolution are generated to configure the feature map 430.

Each element value of the feature map may be converted into the activation map 430 through the activation function of the convolution layer.

In FIG. 7, the input data 420 input to the convolution layer is represented by a two-dimensional matrix having a size of 4×4, and the kernel 410 is represented by a two-dimensional matrix having a size of 3×3. However, the sizes of the input data 420 and the kernel 410 of the convolution layer are not limited thereto, and may be variously changed according to the performance and requirements of the convolutional neural network including the convolution layer.

As shown, when the input data 420 is input to the convolution layer, the kernel 410 traverses the input data 420 at a predetermined interval (e.g., stride=1), the MAC operation of multiplying the values of the input data 420 and the kernel 410 at the same location and adding the respective values may be performed.

Specifically, the kernel 410 assigns the MAC operation value "15" calculated at a specific location 421 of the input data 420 to the corresponding element 431 of the feature map 430. The kernel 410 assigns the MAC operation value "16" calculated at the next position 422 of the input data 420 to the corresponding element 432 of the feature map 430. The kernel 410 assigns the MAC operation value "6" calculated at the next position 423 of the input data 420 to the corresponding element 433 of the feature map 430. Next, the kernel 410 assigns the MAC operation value "15" calculated at the next position 424 of the input data 420 to the corresponding element 434 of the feature map 430.

As described above, when the kernel 410 allocates all MAC operation values calculated while traversing the input data 420 to the feature map 430, the feature map 430 having a size of 2×2 can be generated.

At this time, if the input data 510 is composed of, for example, three channels (R channel, G channel, B channel), a feature map for each channel can be generated through convolution in which the same kernel or different channels for each channel are traversed over data for each channel of the input data 420 and in which multiply and accumulate (MAC) operations are performed.

For the MAC operation, the NPU scheduler 130 may allocate the processing elements PE1 to PE12 to perform each MAC operation based on a predetermined operation sequence, and may set the memory address in which the MAC operation values are stored in the NPU internal memory 120 in consideration of the scheduling sequence.

Figure 8:
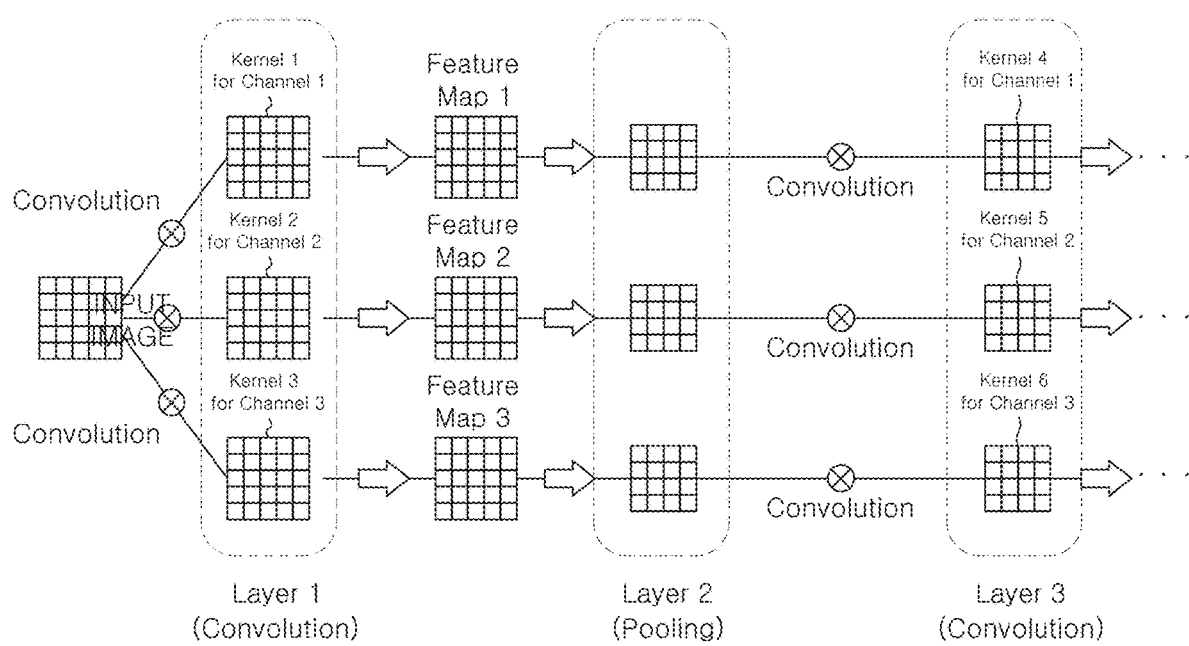
FIG. 8 is a diagram illustrating a generalized operation of a convolutional neural network in an easy-to-understand manner.

FIG. 8 illustrates a generalized operation of a convolutional neural network in an easy-to-understand manner.

Referring to FIG. 8, for example, an input image is shown as a two-dimensional matrix having a size of 5×5. In addition, FIG. 8 shows the use of three channels, i.e., channel 1, channel 2, and channel 3, as an example.

First, the convolution operation of layer 1 will be described.

The input image is convolved with kernel 1 for channel 1 at the first node of layer 1, and as a result, feature map 1 is output. Also, the input image is convolved with kernel 2 for channel 2 at the second node of layer 1, and as a result, feature map 2 is output. Also, the input image is convolved with kernel 3 for channel 3 at the third node, and as a result, feature map 3 is output.

Next, a layer 2 pooling operation will be described.

The feature map 1, the feature map 2, and the feature map 3 output from the layer 1 are input to the three nodes of the layer 2. Layer 2 may receive feature maps output from layer 1 as inputs and may perform pooling. The pooling may reduce the size or emphasize a specific value in a matrix. Pooling methods include maximum pooling, average pooling, and minimum value pooling. Maximum pooling is used to collect the maximum values of values within a specific region of a matrix, and average pooling can be used to find the average within a specific region of a matrix.

In order to process each convolution, the processing elements PE1 to PE12 of the NPU 100 are configured to perform a MAC operation.

In the example of FIG. 8, the size of the feature map of a 5×5 matrix is reduced to a 4×4 matrix by pooling.

Specifically, the first node of layer 2 receives the feature map 1 for channel 1 as an input, performs pooling, and outputs it as, for example, a 4×4 matrix. The second node of layer 2 receives the feature map 2 for channel 2 as an input, performs pooling, and outputs, for example, a 4×4 matrix. The third node of layer 2 receives the feature map 3 for channel 3 as an input, performs pooling, and outputs, for example, a 4×4 matrix.

Next, the convolution operation of layer 3 will be described.

The first node of layer 3 receives the output from the first node of layer 2 as input, performs convolution with kernel 4, and outputs the result. The second node of layer 3 receives the output from the second node of layer 2 as input, performs convolution with kernel 5 for channel 2, and outputs the result. Similarly, the third node of layer 3 receives the output from the third node of layer 2 as input, performs convolution with kernel 6 for channel 3, and outputs the result.

In this way, convolution and pooling are repeated, and finally, as shown in FIG. 5, it may be input to a fully connected layer.

The aforementioned CNN is also widely used in the field of autonomous driving.

Figure 9A:
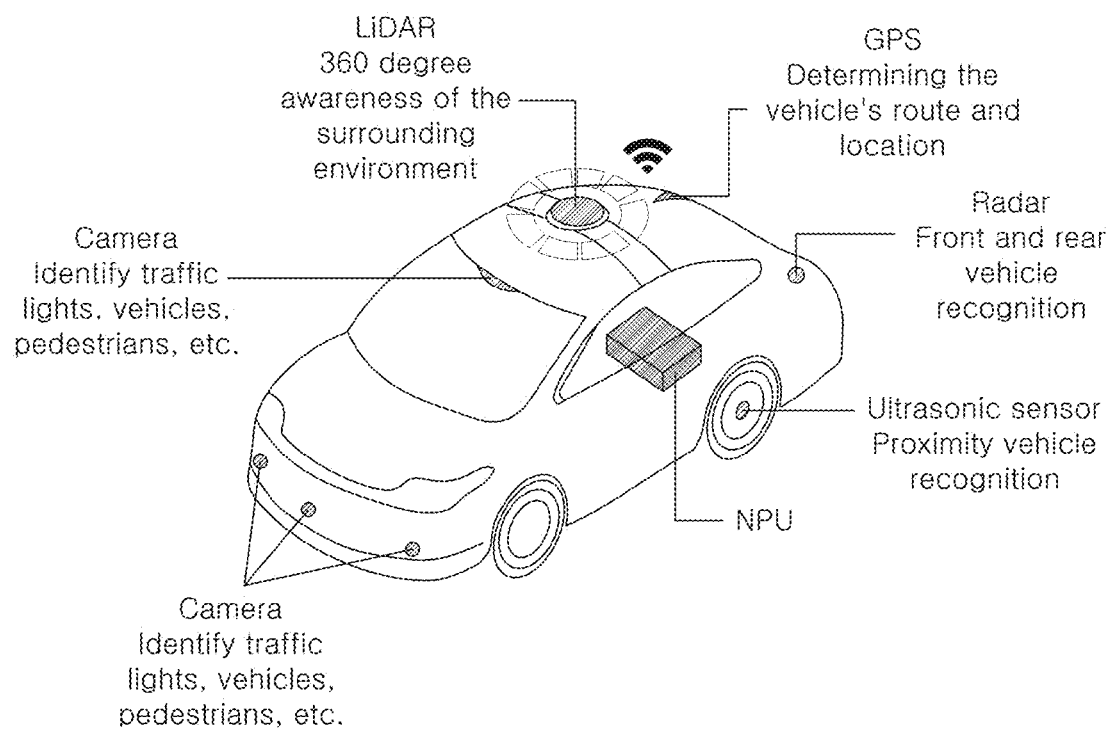
FIG. 9A shows an example of an autonomous vehicle to which the present disclosure is applied.
Figure 9B:
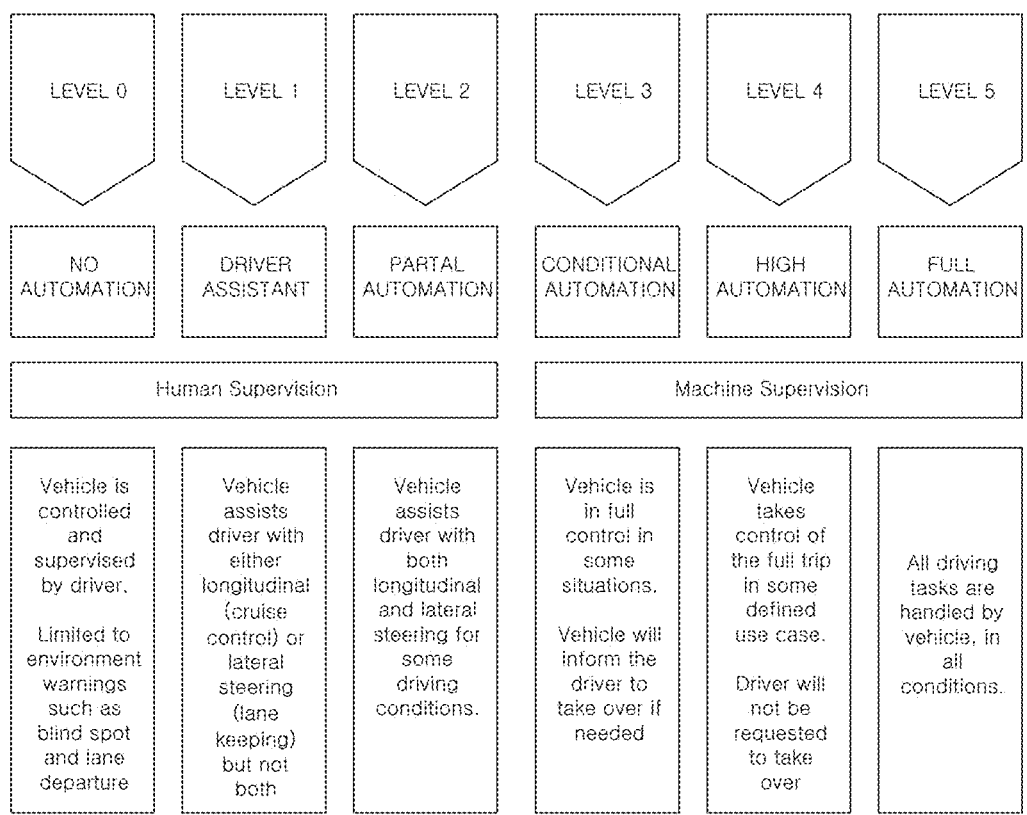
FIG. 9B shows autonomous driving levels as determined by the International Association of Automobile Engineers.

FIG. 9A shows an example of an autonomous vehicle to which the present disclosure is applied. FIG. 9B shows autonomous driving levels as determined by the International Association of Automobile Engineers.

Referring to FIG. 9A, an autonomous vehicle may be equipped with a light detection and ranging (LiDAR), a radar (RADAR), a camera, a GPS, an ultrasonic sensor, an NPU, and the like.

The inventor of the present disclosure has studied an NPU that can assist autonomous driving by using a deep learning technique.

For autonomous driving, NPUs should satisfy four key technical requirements.

1. Perception

NPUs should be able to use sensors to sense, understand, and interpret their surroundings, including static and dynamic obstacles such as other vehicles, pedestrians, road signs, traffic signals, and road curbs.

2. Localization & Mapping

The NPU should be able to locate a vehicle, create a map around the vehicle, and continuously track the location of the vehicle with respect to that map.

3. Path Planning

The NPU should be able to utilize the outputs of the previous two tasks to adopt the optimal, safe, and feasible path for the vehicle to reach its destination, taking into account obstacles in the road.

4. Control

Based on the NPU selected path, the control element should be able to output the acceleration, torque, and steering angle values required for the vehicle to follow the selected path.

Meanwhile, autonomous driving technology requires an advanced driver assistance system (ADAS) and/or a driver's status monitoring (DSM). ADAS and DSM may include the following technologies or the like.

Smart Cruise Control (SCC)
Autonomous Emergency Braking (AEB)
Smart Parking Assistance System (SPAS)
Lane Departure Warning System (LDWS)
Lane Keeping Assist System (LKAS)
Drowsiness detection, alcohol detection, heat and cold detection, carelessness detection, infant neglect detection, and the like.

Various sensors are used in the ADAS technology, and the following sensors can be used as input signals for deep learning.

RGB camera sensor (380 nm-680 nm)
RGB camera with polarizer
Depth camera sensor
NIR camera sensor (850 nm-940 nm)
Thermal camera sensor (9,000 nm-14,000 nm)
RGB+IR hybrid sensor (380 nm-940 nm)
Radar sensor
LiDAR sensor
Ultrasound sensor Meanwhile, with reference to FIG. 9B, each level will be described based on autonomous driving levels as determined by the International Association of Automobile Engineers.

In the no-automation stage, which is level 0, a manually driven vehicle without a vehicle-to-everything (V2X) communication function provides a forward collision-avoidance assist (FCA) function, in which the system simply warns and temporarily intervenes for safety while driving, and a blind-spot collision warning (BCW) function. Therefore, in level 0, the driver must perform all vehicle control.

In the driver assistant stage, which is level 1, a manually driven vehicle, in which a system performs either steering or deceleration/acceleration in a specific driving mode, provides lane following assist (LFA) and smart cruise control (SCC) functions. Accordingly, in level 1, the driver must be aware of vehicle speed and the like.

In the partial automation stage, which is level 2, an autonomous vehicle, in which a system performs both steering and deceleration/acceleration in a specific driving mode, provides a highway driving assist (HDA) function. Accordingly, in level 2, the driver must be aware of obstacles or the like.

Up to level 2, the system assists with some driving of the vehicle (i.e., serve as an assistant). However, from level 3 onwards, the system can perform entire driving operations (i.e., serve as a pilot), that is, the vehicle can change lanes on its own or overtake the vehicle in front, and can avoid obstacles.

In the conditional automation stage, which is level 3, while the system is controlling the vehicle and recognizing the driving environment, it may be necessary for the system to request the driver to take over driving control in an emergency situation. Accordingly, in level 3, the driver must be aware of a specific road condition or the like.

In the high automation stage, which is level 4, the system performs entire driving operations as in level 3 and can safely respond to dangerous situations. Therefore, in level 4, the driver must be aware of the weather, disasters, and accidents.

In the full automation stage, which is level 5, there are no restrictions on the areas where autonomous driving can be performed, unlike level 4. In level 5, driver recognition is unnecessary.

Processing of Heterogeneous Data Signals from Heterogeneous Sensors

In order to improve autonomous driving performance, there is an emerging need for a fusion algorithm to process heterogeneous data provided from heterogeneous sensors. Hereinafter, fusion algorithms will be introduced.

Figure 10:
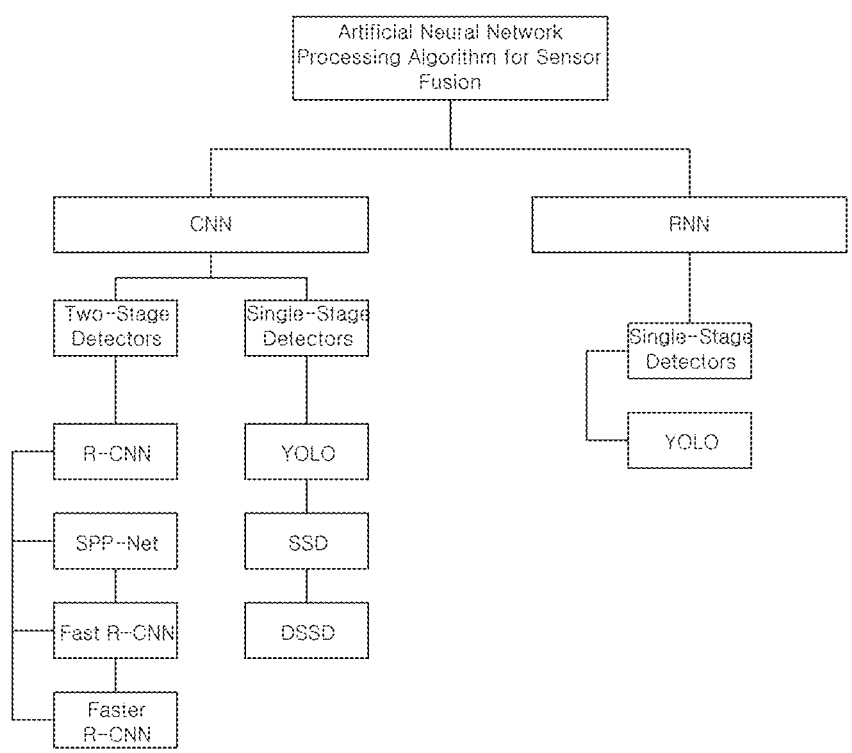
FIG. 10 is an exemplary diagram illustrating a fusion algorithm.

FIG. 10 illustrates a fusion algorithm.

As shown in FIG. 10, a convolutional neural network (CNN) and a recurrent neural network (RNN) may be used for example to process heterogeneous data provided from heterogeneous sensors. CNN can be used to detect an object in an image, and RNN can be used to predict an object by utilizing the time domain. Here, two-stage detection by region-based CNN (R-CCN), spatial pyramid pooling network (SPP-Net), Fast R-CNN, Faster R-CNN, and the like may be used. In addition, single-stage detection using you only look once (YOLO) detection, a single-shot multibox detector (SSD), a deconvolutional single-shot multibox detector (DSSD), long short-term memory (LSTM), a gated recurrent unit (GRU), and the like may be used.

Figure 11A:
FIG. 11A is an exemplary diagram illustrating an example of recognizing an object.
Figure 11B:
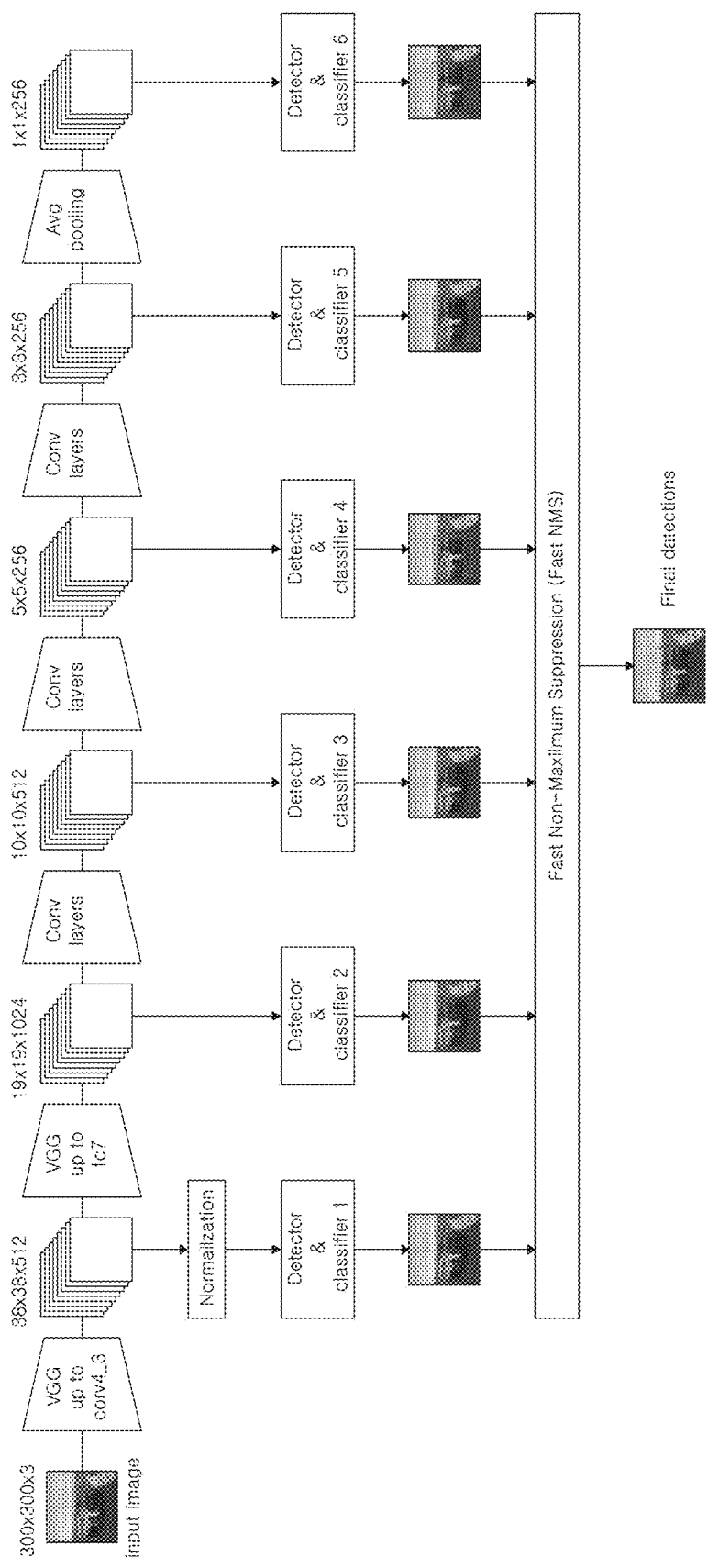
FIG. 11B is an exemplary diagram illustrating a structure of a single shot multibox detector (SSD).

FIG. 11A illustrates an example of recognizing an object, and FIG. 11B illustrates a structure of a single shot multibox detector (SSD).

As illustrated in FIG. 11A, a plurality of objects can be detected in an image by using the SSD artificial neural network model. Referring to FIG. 11B, the SSD model may detect an object in the feature map for each step. For example, the SSD may be combined with a backbone of a VGG structure or a Mobilenet structure.

Figure 12A:
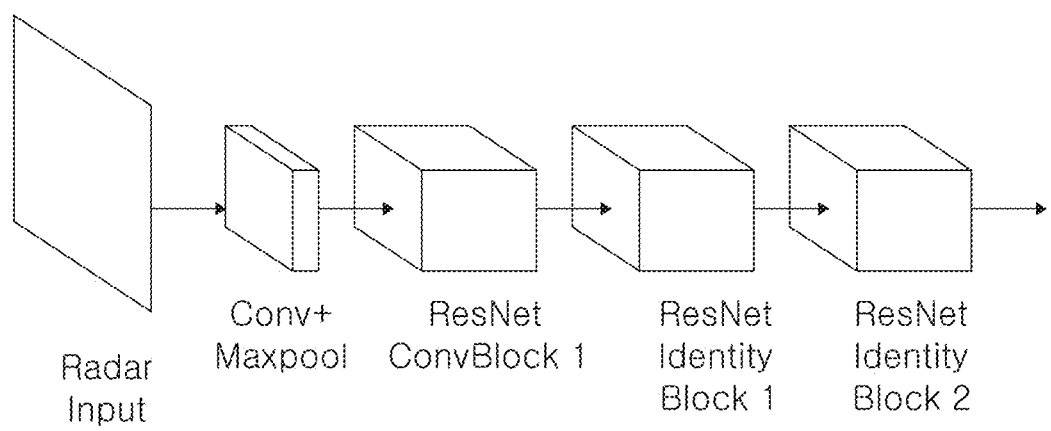
FIG. 12A shows an example of an artificial neural network using a radar mounted on a vehicle.
Figure 12B:
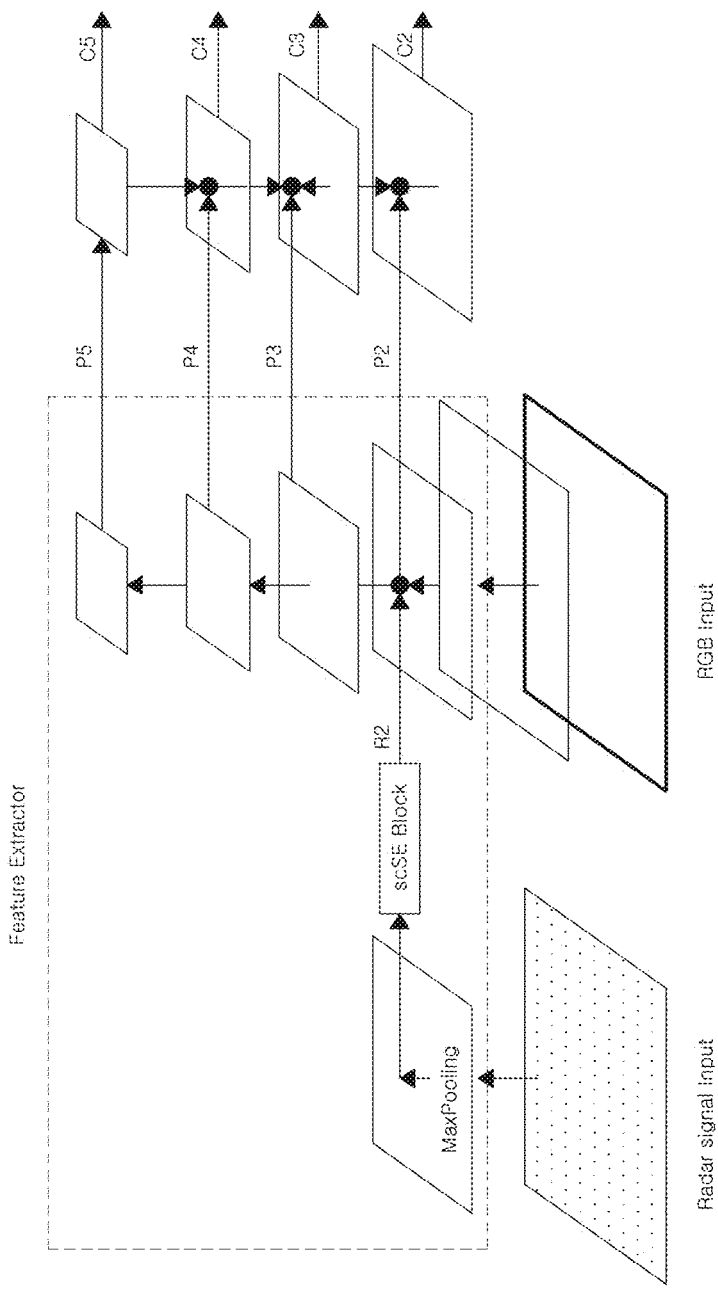
FIG. 12B shows an example of a fusion processing method utilizing a radar and a camera.

FIG. 12A shows an example of an artificial neural network using a radar mounted on a vehicle. FIG. 12B shows an example of a fusion processing method utilizing a radar and a camera.

In order to process the signal provided from the radar, the artificial neural network shown in FIG. 12A may include convolution, pooling, ResNet, and the like.

In order to process the signal provided from the radar and the RGB signal provided from the camera, the fusion artificial neural network shown in FIG. 12B may be used.

Figure 13:
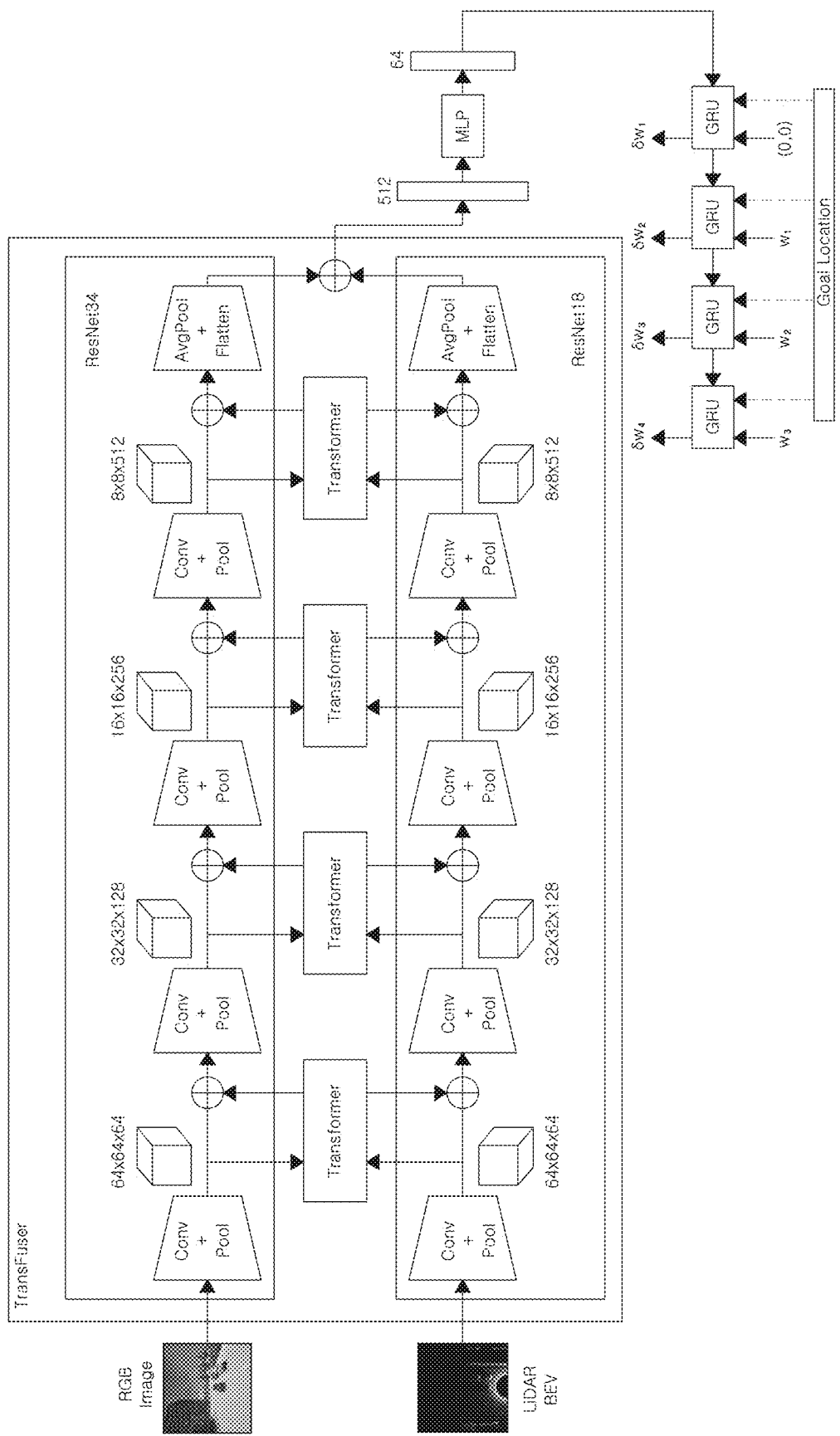
FIG. 13 shows an example of a fusion artificial neural network using a LiDAR and a camera.

FIG. 13 shows an example of a fusion ANN using a LiDAR and a camera.

Figure 14:
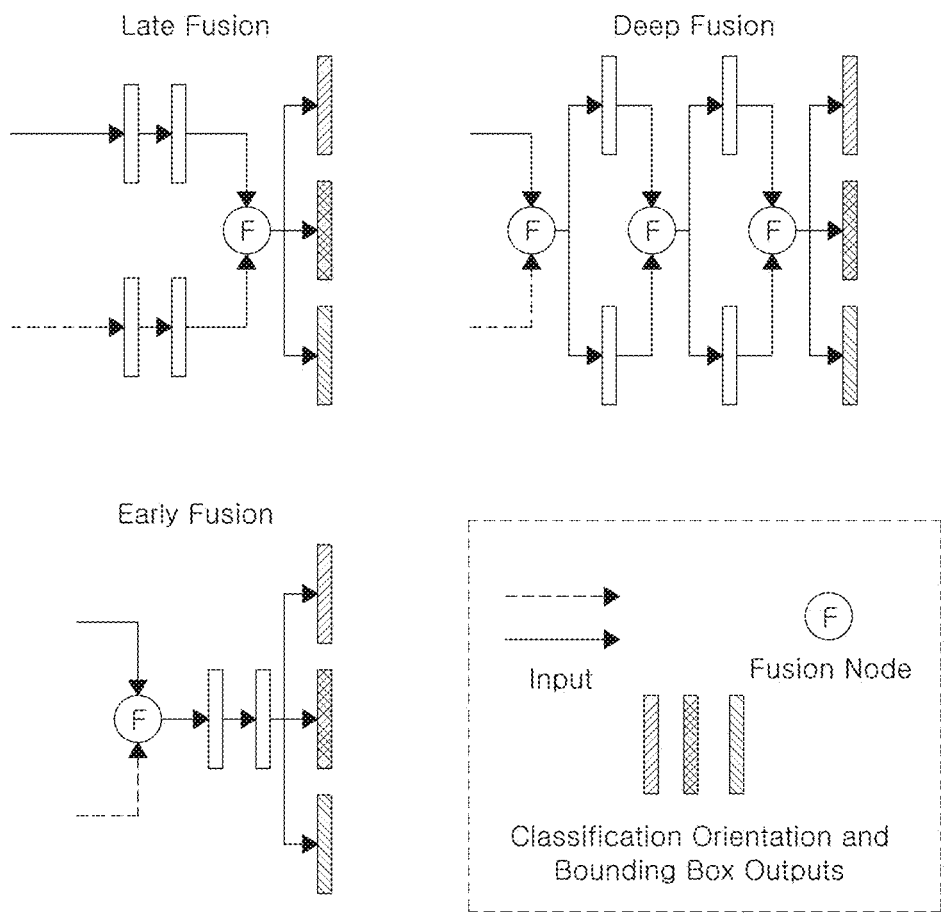
FIG. 14 is an exemplary diagram illustrating late fusion, early fusion, and deep fusion.

Referring to FIG. 13, an example of processing an RGB signal provided from a camera and a signal provided from a LiDAR through parallel processing is shown. During parallel processing, heterogeneous data can be exchanged through transformers. The method may be the deep fusion method as shown in FIG. 14.

Meanwhile, although not shown, in order to process heterogeneous data provided from heterogeneous sensors, the artificial neural network may include a concatenation operation and a skip-connection operation. The concatenation operation means merging output results of a specific layer with each other, and the skip-connection operation means skipping the output result of a specific layer and transferring the output result of a specific layer to another layer.

Such a concatenation operation and skip-connection operation may increase the control difficulty and usage of the internal memory 120 of the NPU 100.

An artificial neural network for fusion processing of heterogeneous data provided from heterogeneous sensors is described. However, there was a limit to the performance improvement of artificial neural networks only with the above-described contents. Therefore, the optimized artificial neural network and NPU structure will be described below.

Fusion ANN and NPU Structure Optimized to Process Heterogeneous Data from Heterogeneous Sensors First, the inventor of the present disclosure has researched NPU for processing different data from heterogeneous sensors.

In the design of the NPU, the following configuration items I-VII should be considered.
- I. An NPU architecture suitable for processing heterogeneous data signals (e.g., RGB camera+radar) is required.
- II. NPU memory control suitable for heterogeneous input signal processing (e.g., RGB camera+radar) is required.
- III. An NPU architecture suitable for multiple input channels (ADAS and DSM) is required.
- IV. NPU memory control suitable for multiple input channels (ADAS & DSM) is required.
- V. An NPU architecture suitable for fusion ANN model computation is required.
- VI. For real-time application, a fast processing speed of 16 ms or less per one inference operation is required.
- VII. Low power consumption for battery operation is required.

An NPU to process a fusion artificial neural network should support at least a minimum of functions I-VII. The following are expected requirements.
- I. CNN function support. Controlling the array of processing elements and memory for a convolution operation should be optimized.
- II. Ability to process depth-wise separable convolution efficiently. It should have an architecture that improves PE utilization rate and throughput.
- III. Batch-mode function support. Memory configuration is required to process multiple channels (i.e., camera 1 to camera 6) and heterogeneous sensors simultaneously.
- IV. Concatenation function support. The NPU for a fusion ANN must be able to process heterogeneous input data signals with a concatenation function.
- V. Skip-connection function support. The NPU for the fusion ANN may include a special function unit (SFU) that can provide a skip-connection function.
- VI. Support image preprocessing function for deep learning. An NPU for a fusion ANN should be able to provide a function to pre-process heterogeneous data signals.
- VII. A compiler capable of efficiently compiling fusion neural networks should be provided.

The inventor of the present disclosure proposes an NPU having the following characteristics I-IV.
- I. The NPU may include a compiler that analyzes ANN data locality information of an artificial neural network, such as late fusion, early fusion, and deep fusion.
- II. The NPU may be configured to control the array of processing elements to process heterogeneous sensor data based on an ANN data locality controller (ADC). That is, the fusion ANN combines structures that are varied according to sensor, and the PE utilization rate can be improved by providing the NPU 100 corresponding to the structure.
- III. It may be configured to appropriately set the size of the on-chip internal memory 120 to process heterogeneous sensor data based on the ANN data locality information. That is, the memory bandwidth of the NPU processing the fusion ANN can be improved by analyzing the locality information of the ANN data.
- IV. The NPU may include a special function unit (SFU) that can efficiently process bilinear interpolation, concatenation, and skip-connection required in a fusion ANN.

FIG. 14 illustrates late fusion, early fusion, and deep fusion.

Referring to FIG. 14, "F" represents a fusion operation, and each block represents each layer. As can be seen with reference to FIG. 14, late fusion may be referred to as performing an operation for each layer and then fusion of the operation result in the final process. Early fusion may be referred to as early fusion of different data and then performing an operation for each layer. Deep fusion may be referred to as fusion of heterogeneous data, performing an operation in different layers, fusion of the operation result again, and then performing an operation for each layer.

Figure 15:
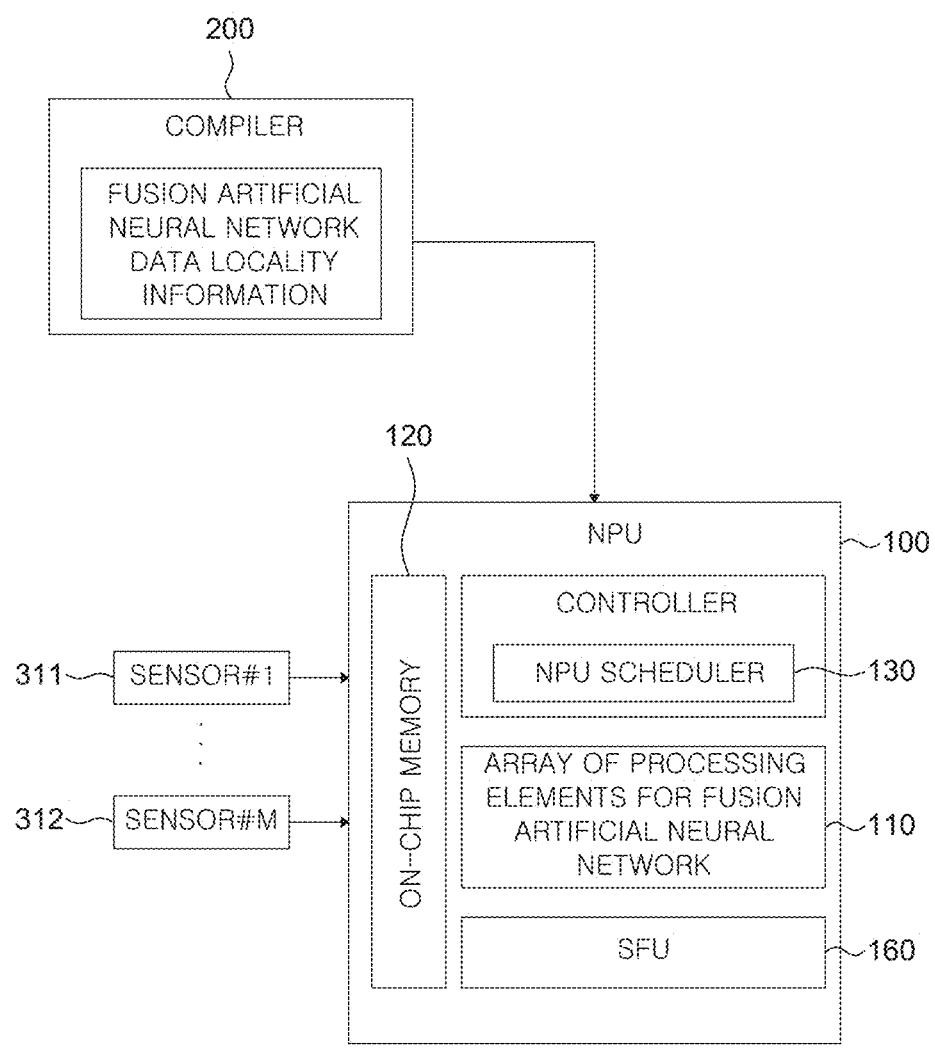
FIG. 15 is an exemplary diagram illustrating a system including the NPU architecture according to a first example.

FIG. 15 illustrates a system including the NPU architecture according to a first example.

As illustrated in FIG. 15, the NPU 100 may include an array of processing elements 110 for a fusion ANN, an on-chip memory 120, an NPU scheduler 130, and a special function unit (SFU) 160. For describing FIG. 15, redundant descriptions may be omitted for convenience of description only.

The array of processing elements 110 for the fusion ANN may refer to the array of processing element 110 configured to process the convolution of a multi-layered neural network model having at least one fusion layer. That is, the fusion layer may be configured to output a feature map in which data of heterogeneous sensors are combined or fused together. In more detail, the SFU 160 of the NPU 100 may be configured to receive multiple sensors and provide a function of fusion of each sensor input. The array of processing elements 110 for the fusion ANN may be configured to receive fusion data from the SFU 160 and process convolution.

The NPU 100 may receive heterogeneous data from the M heterogeneous sensors 311 and 312. The heterogeneous sensors may include a camera, radar, LiDAR, ultrasound, thermal imaging camera, and the like.

The NPU 100 may obtain fusion artificial neural network (ANN) data locality information from the compiler 200.

At least one layer of the fusion ANN may be a layer in which input data of a plurality of sensors are combined or fused together.

The NPU 100 may be configured to provide a concatenation function to at least one layer for fusion of heterogeneous sensor input data. In order to connect each feature map of the heterogeneous sensors of the concatenated layer to each other, the size of at least one axis may be processed to be the same. For example, in order to concatenate heterogeneous sensor data along the X-axis, the size of the X-axis of each of the different types of sensor data may be the same. For example, in order to concatenate heterogeneous sensor data along the Y-axis, the Y-axis size of each of the heterogeneous sensor data may be the same. For example, in order to concatenate heterogeneous sensor data along the Z-axis, the Z-axis sizes of the different types of sensor data may be the same.

In order to receive and process heterogeneous data from the heterogeneous sensors 311 and 312, the NPU scheduler 130 may process inference of a fusion ANN model.

The NPU scheduler 130 may be included in the controller as shown in FIG. 15.

The NPU scheduler 130 may obtain and analyze data locality information of a fusion ANN from the compiler 200, and may control the operation of the on-chip memory 120.

Specifically, the compiler 200 may generate data locality information of a fusion ANN to be processed by the NPU 100.

The NPU scheduler 130 may generate a list for a special function required for the fusion ANN. The special function may mean various functions required for ANN operation other than convolution operation.

If the fusion ANN data locality information is efficiently utilized, it is possible to efficiently decrease the frequency of increasing memory access problem, which frequently occurs in fusion artificial neural networks, such as non-maximum suppression (NMS), skip-connection, bottleneck, and bilinear interpolation and the like.

If the fusion ANN data locality information is utilized, the size of the data (i.e., the first feature map) to be stored and a period of the data to be stored can be analyzed in the compilation stage with respect to the fusion of the first output feature map information to be processed first and the second output feature map information to be processed next. Accordingly, a memory map for the on-chip memory 120 can be efficiently set in advance.

The SFU 160 may perform skip-connection and concatenation necessary for a fusion ANN. In other words, concatenation can be utilized to fuse together (combine) heterogeneous sensor data. For concatenation, the size of each sensor data can be readjusted. For example, the NPU 100 may be configured to handle the concatenation of the fusion artificial neural network by providing functions such as resizing, interpolation, and the like.

The on-chip memory 120 of the NPU 100 may selectively preserve specific data according to the array of processing elements 110 or the SFU 160 for a specific period based on the ANN data locality information. Whether or not to preserve the selective storage may be controlled by the controller.

Also, the array of processing elements 110 may be configured to have a plurality of threads corresponding to the number of heterogeneous sensors. That is, the array 110 of the NPU 100 configured to receive two-sensor data may be configured to have two threads. That is, if a thread is configured with N×M processing elements, two threads may be configured with N×M×2 processing elements. For example, each thread of the array of processing elements 110 may be configured to process a feature map of each heterogeneous sensor.

The NPU 100 may output the operation result of the fusion ANN through an output unit.

The NPU architecture according to the first example described above may be variously modified.

Figure 22:
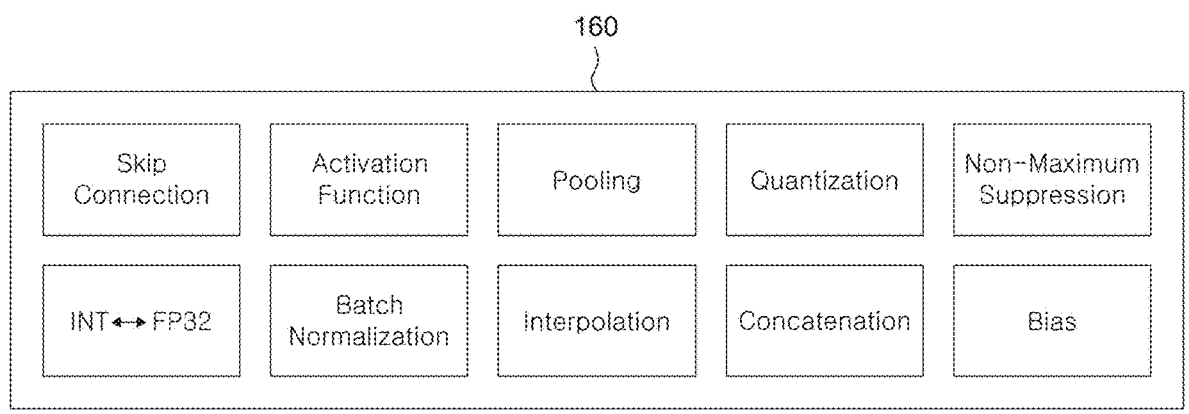
FIG. 22 is an exemplary diagram illustrating a first example of the pipeline structure of the SFU shown in FIG. 21.

Although, the SFU 160 is illustrated as a separate unit apart from the array of processing element for fusion artificial neural network 110 in FIG. 15, it can be implemented such that at least one processing element is configured to include at least one function unit among a plurality of function units of the SFU 160 as illustrated in FIG. 22 in order to substitute the array of processing element for fusion artificial neural network 110 and the SFU 160. In other words, at least one processing element can be configured to perform fusion operations of the fusion ANN by performing a convolution operation and at least one special function operation with corresponding function unit. That is, at least one processing element can be configured to perform a specific artificial neural network operation for a fusion ANN for the examples of the present disclosure.

Figure 16A:
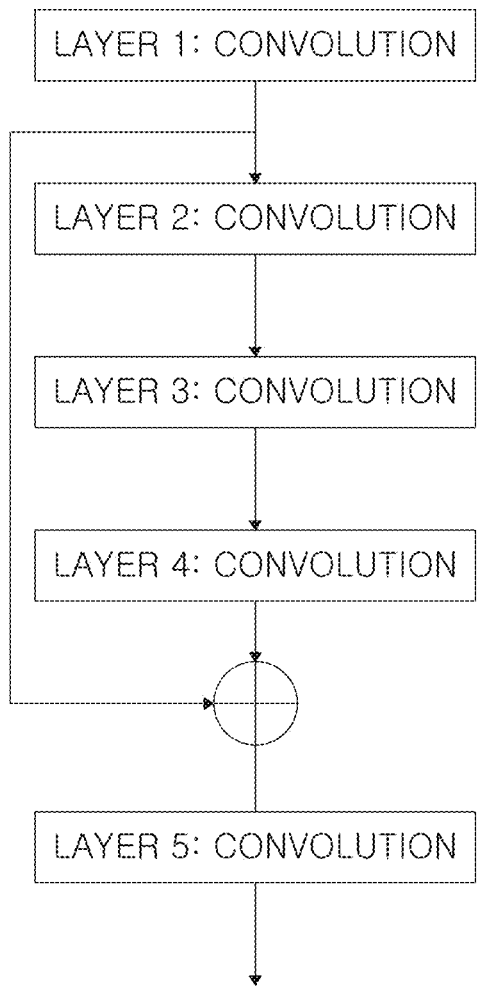
FIG. 16A is an exemplary diagram illustrating a model of an artificial neural network including skip-connection.

FIG. 16A illustrates a model of an artificial neural network including skip-connection. FIG. 16B illustrates data of ANN locality information including skip-connection.

As shown in FIG. 16A, in order to calculate five layers including a skip-connection operation, for example, as shown in FIG. 16B, the compiler 200 may generate ANN data locality information having a sequence of sixteen steps.

The NPU 100 may request a data operation to the on-chip memory 120 according to the sequence of the ANN data locality information.

In the case of a skip-connection operation, the output feature map OFMAP of the first layer may be added to the output feature map OFMAP of the fourth layer.

For such a skip-connection operation, the output feature map of the first layer must be preserved until the fifth layer operation. However, other data may be deleted after operation in order to utilize memory space.

In the deleted memory area, data to be calculated later based on the sequence of ANN data locality information may be stored. Accordingly, it is possible to sequentially bring necessary data to the on-chip memory 120 according to the sequence of the ANN data locality information, and delete data that is not reused. Accordingly, even if the memory size of the on-chip memory 120 is small, the operating efficiency of the on-chip memory 120 may be improved.

Therefore, the NPU 100 may selectively preserve or delete specific data of the on-chip memory 120 for a predetermined period based on the ANN data locality information.

Such a principle may be applied not only to a skip-connection operation, but also to various operations such as concatenation, non-maximum suppression (NMS), and bilinear interpolation.

For example, the NPU 100 performs the convolution operation of the second layer for efficient control of the on-chip memory 120 and then deletes the data of the first layer except for the output feature map OFMAP of the first layer. For another example, after performing the operation of the third layer for efficient control of the on-chip memory 120, the NPU 100 may delete data of the second layer except for the output feature map OFMAP of the first layer. For another example, after the NPU 100 performs the operation of the fourth layer for efficient control of the chip-internal memory 120, the data of the third layer except for the output feature map OFMAP of the first layer may be deleted. Further, after the NPU 100 performs the operation of the fifth layer for efficient control of the chip-internal memory 120, the data of the fourth layer and the output feature map OFMAP of the first layer may be deleted.

The ANN data locality information may include a data processing sequence to be generated by the compiler 200 and performed by the NPU 100 in consideration of the conditions 1-5 listed below.

1. Structure of ANN model. This includes fusion artificial neural networks such as Resnet, YOLO, SSD, and the like designed to receive heterogeneous sensor data.

2. Processor (e.g., CPU, GPU, NPU) architecture. In the case of an NPU, this includes the number of processing elements, the structure of the processing element (e.g., input stationary, output stationary, weight stationary, and the like), SFU structure configured to operate with the array of processing element, and the like.
3. On-chip memory 120 size. This considers, for example, a tiling algorithm to be required when the cache size is smaller than the data.
4. Data size of each layer of the fusion ANN model to be processed.
5. Processing policy. That is, the NPU 100 determines the sequence of whether the input feature map (IFMAP) read is requested first or the kernel (Kernel) read is requested first. This may vary depending on the processor or compiler.

Figure 17:
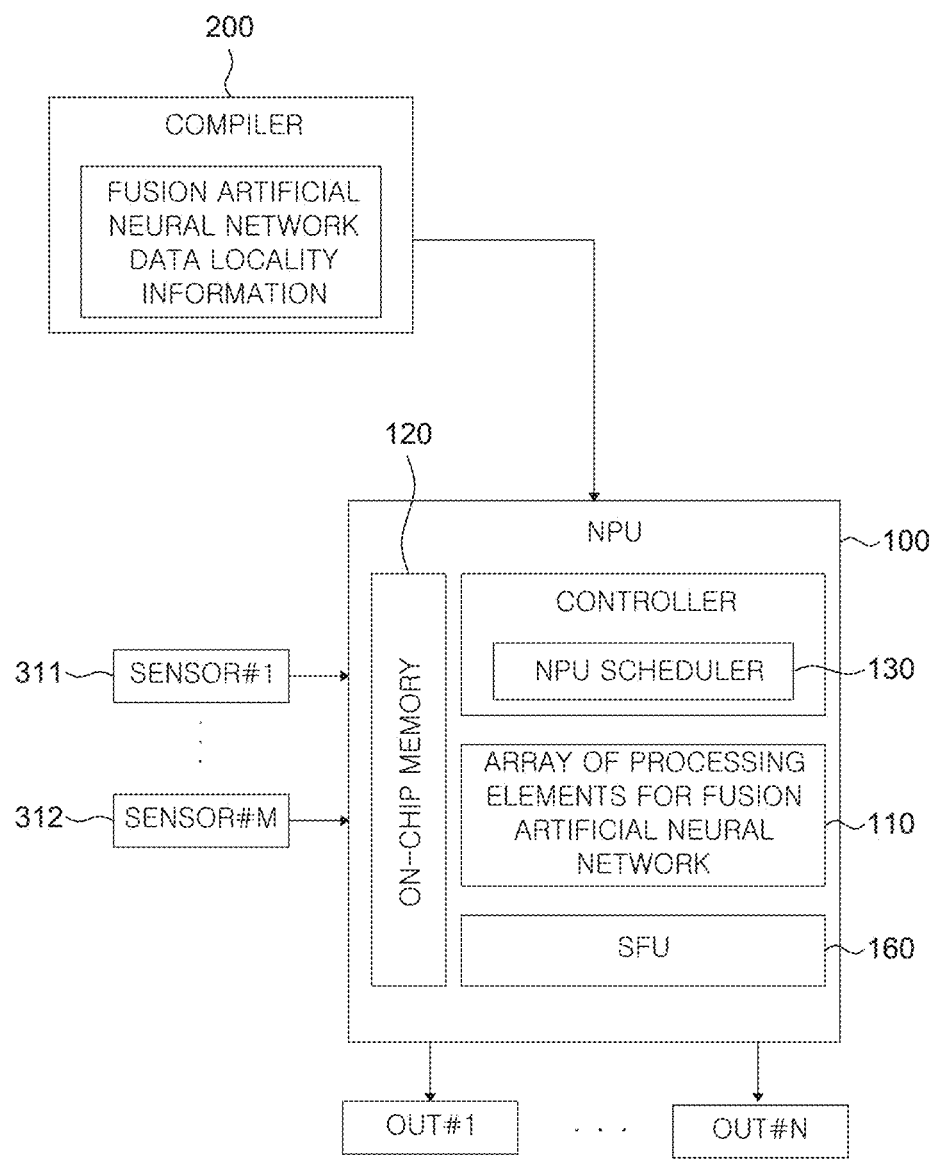
FIG. 17 is an exemplary diagram illustrating a system including an NPU architecture according to a second example.

FIG. 17 illustrates a system including an NPU architecture according to a second example.

Referring to FIG. 17, the NPU 100 may include an array of processing elements 110 for a fusion artificial neural network, an on-chip memory 120, an NPU scheduler 130, and a special function unit (SFU) 160. For describing FIG. 17, redundant descriptions may be omitted for convenience of description only.

The NPU scheduler 130 may be included in the controller as shown in FIG. 17.

The NPU 100 may receive heterogeneous data from the M heterogeneous sensors 311 and 312. The heterogeneous sensors may include a camera, radar, LiDAR, ultrasound, thermal imaging camera, and the like.

The NPU 100 may obtain fusion ANN data locality information from the compiler 200.

The NPU 100 may output N results (e.g., heterogeneous inference results) through N output units. The heterogeneous data output from the NPU 100 may be classification, semantic segmentation, object detection, prediction, or the like.

Figure 18:
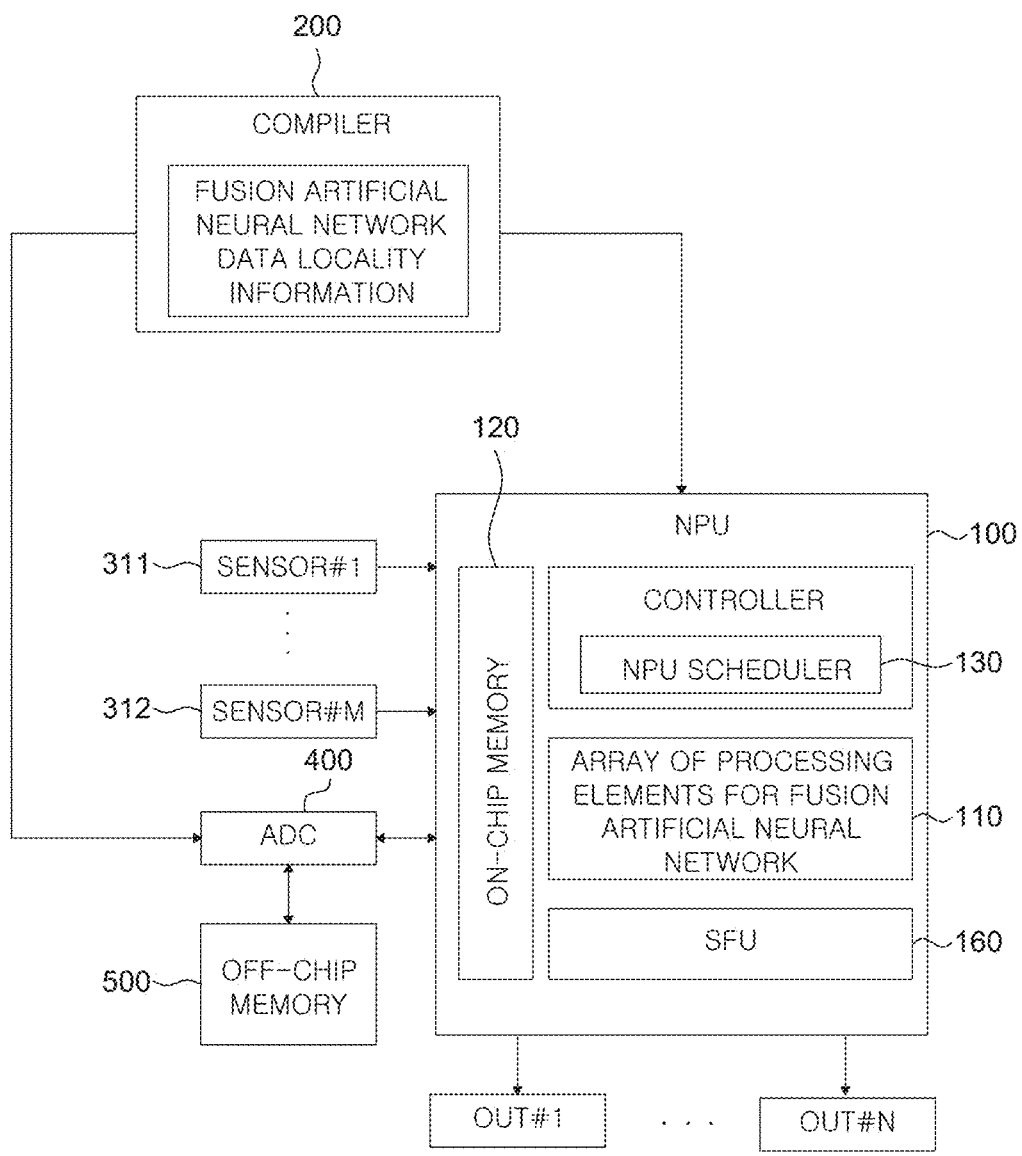
FIG. 18 is an exemplary diagram illustrating a system including an NPU architecture according to a third example.

FIG. 18 illustrates a system including an NPU architecture according to a third example.

Referring to FIG. 18, the NPU 100 may include an array of processing elements 110 for a fusion artificial neural network, an on-chip memory 120, an NPU scheduler 130, and a special function unit (SFU) 160. For describing FIG. 18, redundant descriptions may be omitted for convenience of description only.

The NPU scheduler 130 may be included in the controller as shown in FIG. 18.

The NPU 100 may receive heterogeneous data from the M heterogeneous sensors 311 and 312. The heterogeneous sensors may include a camera, radar, LiDAR, ultrasound, thermal imaging camera, and the like.

The NPU 100 may obtain fusion ANN data locality information from the compiler 200.

The NPU 100 may receive data necessary for ANN operation from the off-chip memory 500 through an ANN data locality controller (ADC) 400.

The ADC 400 may manage data in advance based on ANN data locality information provided from the compiler 200.

Specifically, the ADC 400 may receive and analyze ANN data locality information of a fusion ANN from the compiler 200 or by receiving the analyzed information from the compiler to control the operation of the off-chip memory 500.

The ADC 400 may read data stored in the off-chip memory 500 and cache the data stored in the off-chip memory 500 in advance in the on-chip memory according to the fusion ANN data locality information. The off-chip memory 500 may store all weight kernels of the fusion ANN. In addition, the off-chip memory 120 may store only at least a portion of the weight kernels necessary according to the ANN data locality information among all the weight kernels stored in the off-chip memory 500. The memory capacity of the off-chip memory 500 may be greater than the memory capacity of the on-chip memory 120.

The ADC 400 may be configured to prepare data, required for the NPU 100 independently or interlocked with the NPU 100 based on the ANN data locality information, in advance from the off-chip memory 500 to reduce the latency of the inference operation of the NPU 100 or to improve the operation speed.

The NPU 100 may output N results (e.g., heterogeneous inference results) through N output units.

Figure 19:
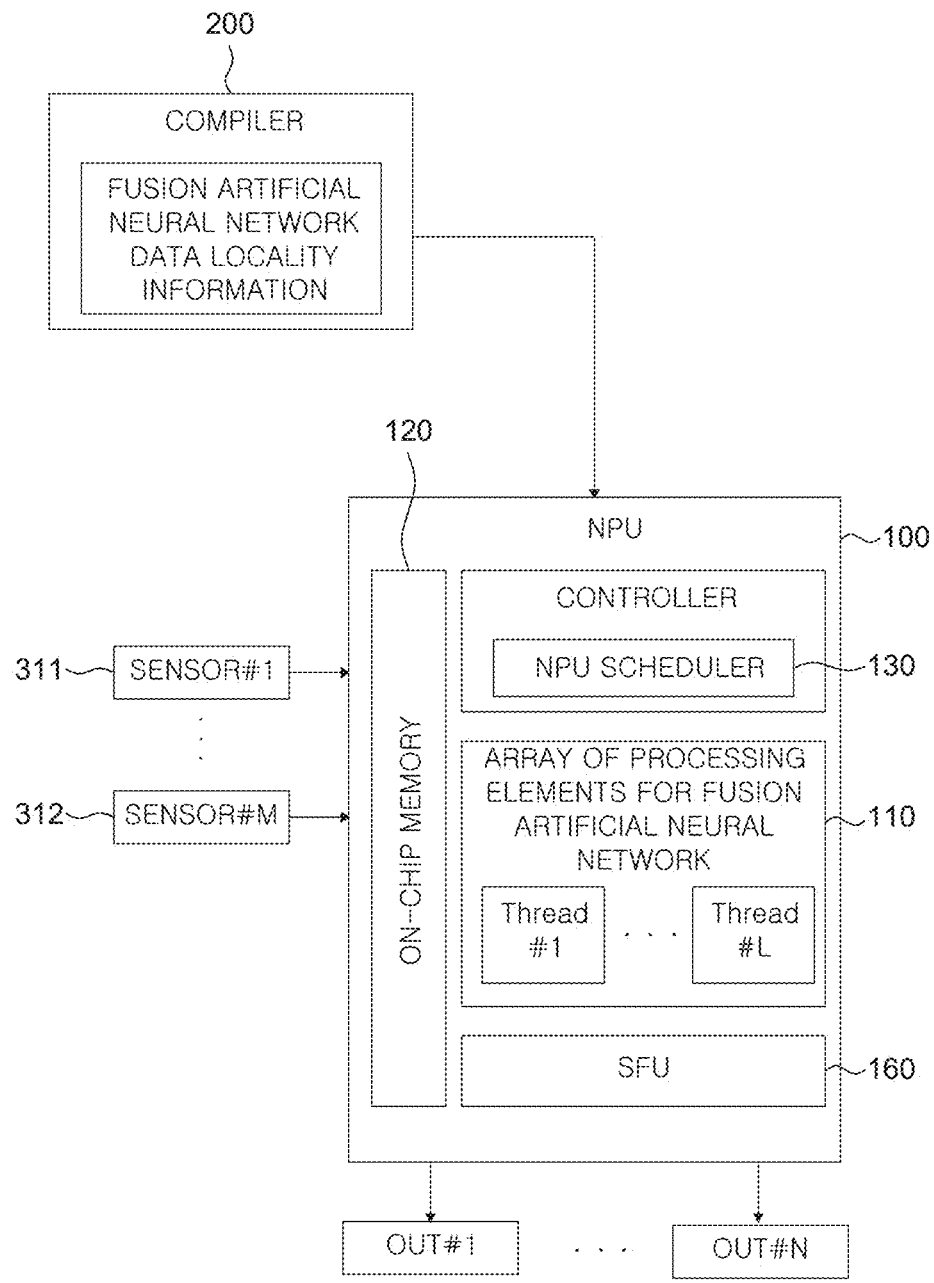
FIG. 19 is an exemplary diagram illustrating a system including an NPU architecture according to a fourth example.
Figure 20:
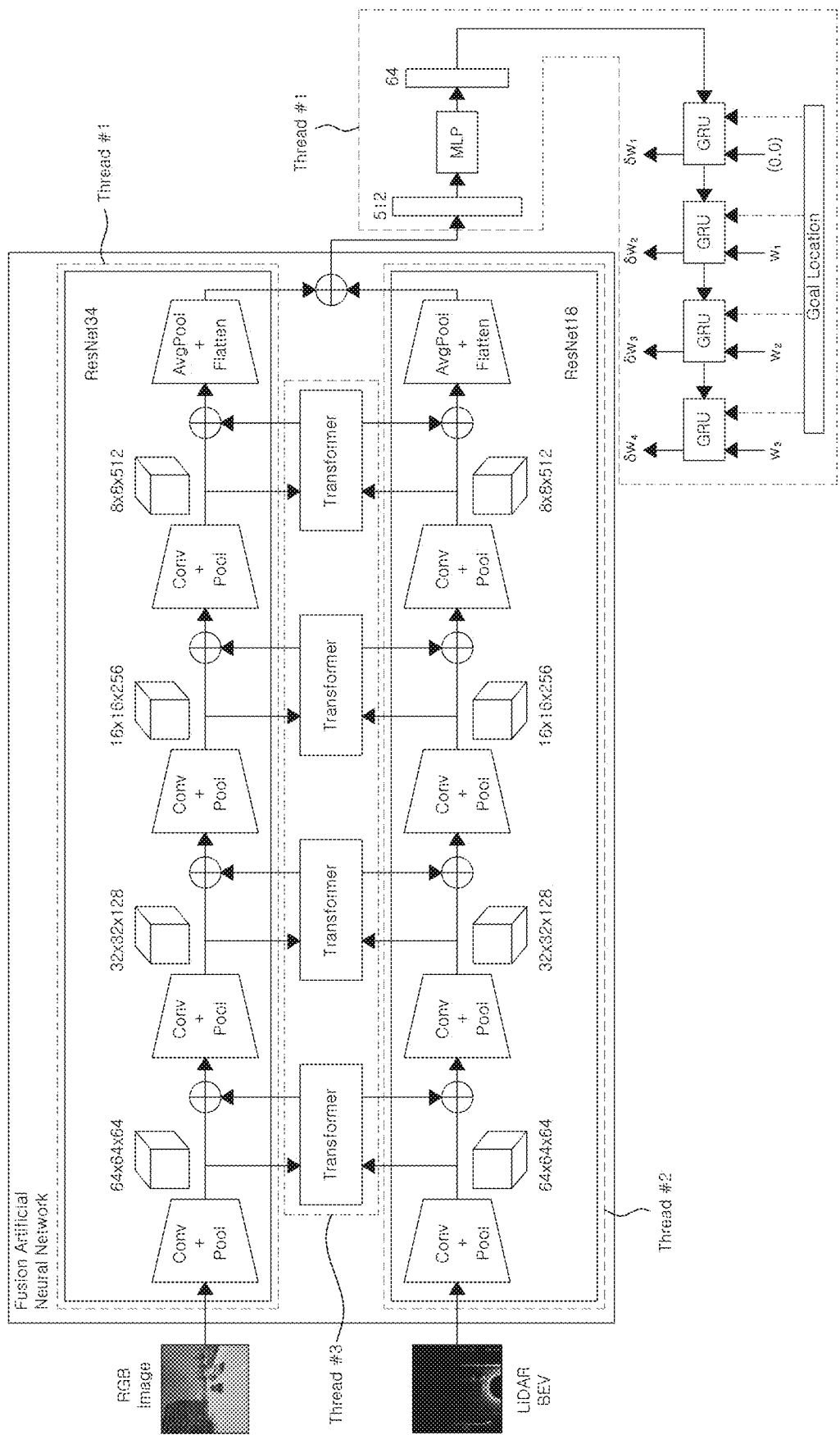
FIG. 20 shows an example in which the fusion artificial neural network shown in FIG. 13 is divided into threads according to the fourth example shown in FIG. 19.

FIG. 19 illustrates a system including an NPU architecture according to a fourth example. FIG. 20 shows an example in which the fusion artificial neural network shown in FIG. 13 is divided into threads according to the fourth example shown in FIG. 19.

Referring to FIG. 19, the NPU 100 may include an array of processing elements 110 for a fusion artificial neural network, an on-chip memory 120, an NPU scheduler 130, and a special function unit (SFU) 160.

The NPU scheduler 130 may be included in the controller as shown in FIG. 19.

The NPU 100 may receive heterogeneous data from the M heterogeneous sensors 311 and 312. The heterogeneous sensors may include a camera, radar, LiDAR, ultrasound, thermal imaging camera, and the like.

The NPU 100 may obtain fusion ANN data locality information from the compiler 200.

The NPU 100 may output N results (e.g., heterogeneous inference results) through N output units. The heterogeneous data output from the NPU 100 may be classification, semantic segmentation, object detection, prediction, or the like.

The array of processing elements 110 can be processed as multiple threads. As shown in FIG. 20, RGB image data obtained from the camera may be processed through thread #1, conversion may be processed through thread #2, and data obtained from the LiDAR may be processed through thread #3.

To this end, the compiler 200 may analyze the ANN model and classify the threads based on the parallel operation flow.

The array of processing elements 110 of the NPU 100 can improve computational efficiency through multiple threads for a layer capable of parallel processing of a fusion ANN.

The array of processing elements 110 of the NPU 100 may include a predetermined thread.

The NPU 100 may control each thread of the array of processing elements 110 to communicate with the on-chip memory 120.

The NPU 100 may selectively allocate an internal space of the on-chip memory 120 for each thread.

The NPU 100 may allocate an appropriate space of the on-chip memory 120 for each thread. The memory allocation of the on-chip memory 120 may be determined by the controller based on ANN data locality information of the fusion ANN.

The NPU 100 may set a thread in the array of processing elements 110 based on a fusion ANN.

The NPU 100 may output N results (e.g., heterogeneous inference results) through N output units.

Figure 21:
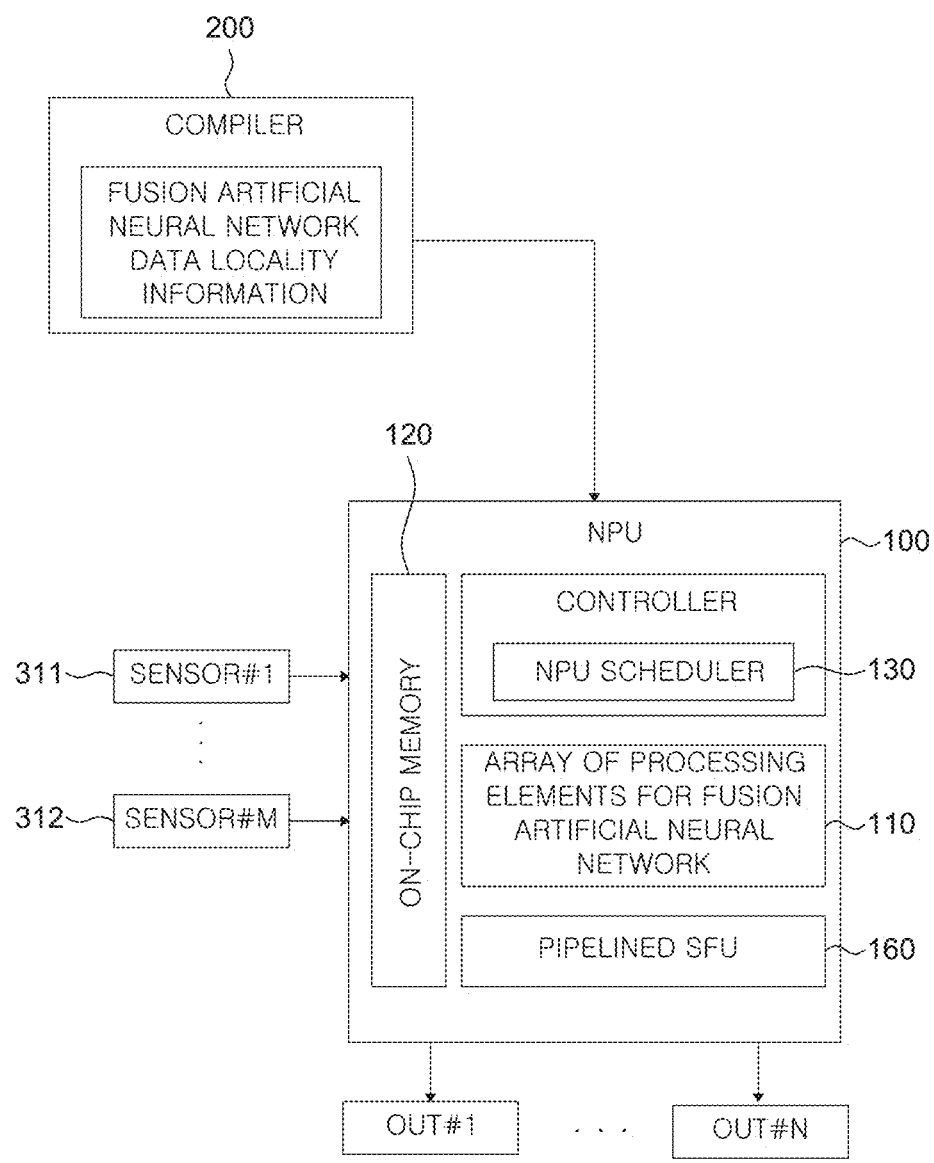
FIG. 21 is an exemplary diagram illustrating a system including an NPU architecture according to a fifth example.

FIG. 21 illustrates a system including an NPU architecture according to a fifth example. FIG. 22 illustrates a first example of the pipeline structure of the SFU shown in FIG. 21.

Referring to FIG. 21, the NPU 100 may include an array of processing elements 110 for a fusion ANN, an on-chip memory 120, an NPU scheduler 130, and a special function unit (SFU) 160.

The NPU 100 may receive heterogeneous data from the M heterogeneous sensors 311 and 312. The heterogeneous sensors may include a camera, radar, LiDAR, ultrasound, thermal imaging camera, and the like.

The NPU 100 may obtain fusion ANN data locality information from the compiler 200.

The NPU 100 may output N results (e.g., heterogeneous inference results) through N output units. The heterogeneous data output from the NPU 100 may be classification, semantic segmentation, object detection, prediction, or the like.

Referring to FIG. 22, the SFU 160 may include a plurality of function units. Each function unit can be selectively operated. Each function unit can be selectively turned on or off. That is, each function unit is configurable.

In other words, the SFU 160 may include various function units required for fusion ANN inference operations.

For example, the function unit of the SFU 160 may include a function unit for a skip-connection operation, a function unit for an activation function operation, a function unit for a pooling operation, a function unit for a quantization operation, a function unit for non-maximum suppression (NMS) operation, a function unit for integer to floating-point conversion (INT to FP32), a function unit for batch-normalization operation, a function unit for interpolation operation, a function unit for concatenation operation, a function unit for bias operation, and the like.

The function units of the SFU 160 may be selectively turned-on or turned-off by ANN data locality information. The ANN data locality information may include turn-off or turn-off-related control information of a corresponding function unit when an operation for a specific layer is performed.

Figure 23A:
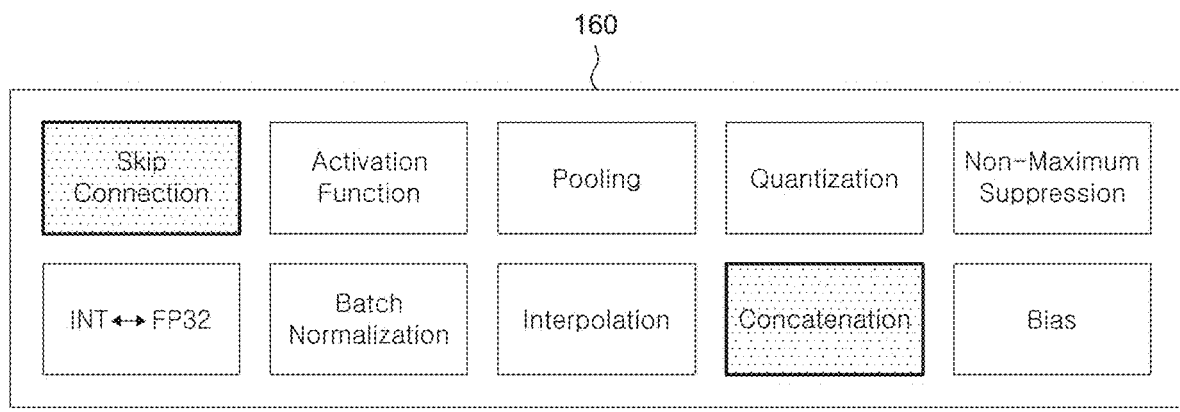
FIG. 23A is an exemplary diagram illustrating a second example of the pipeline structure of the SFU shown in FIG. 21.
Figure 23B:
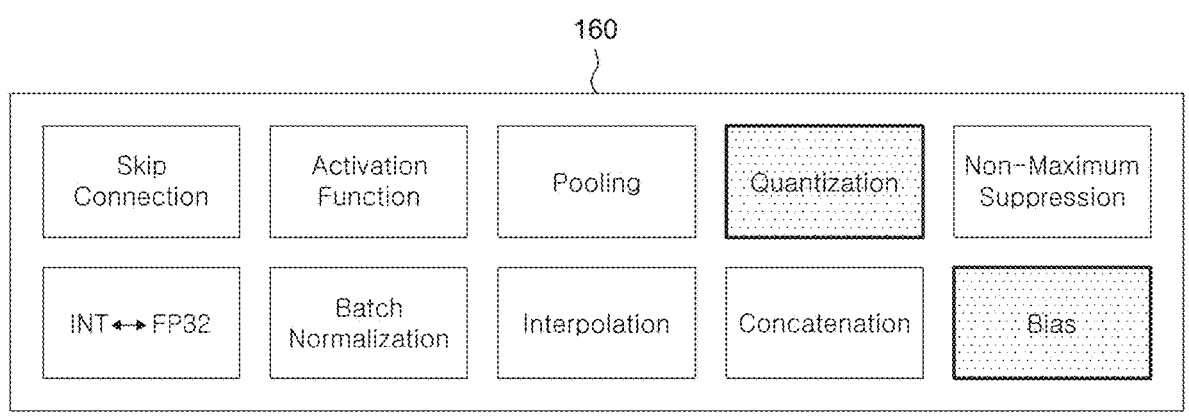
FIG. 23B is an exemplary diagram illustrating a third example of the pipeline structure of the SFU shown in FIG. 21.

FIG. 23A illustrates a second example of the pipeline structure of the SFU shown in FIG. 21. FIG. 23B illustrates a third example of the pipeline structure of the SFU shown in FIG. 21.

As illustrated in FIG. 23A and FIG. 23B, an activated unit among function units of the SFU 160 may be turned-on.

Specifically, as shown in FIG. 23A, the SFU 160 may selectively activate a skip-connection operation and a concatenation operation. Illustratively, each activated function unit is marked with hatching in the drawings.

For example, the SFU 160 may concatenate heterogeneous sensor data for a fusion operation. For example, in order to skip-connect the SFU 160, the controller may control the on-chip memory 120 and the SFU 160.

Specifically, as shown in FIG. 23B, the quantization operation and the bias operation can be selectively activated. For example, in order to reduce the size of the feature map data output from the array of processing elements 110, the quantization function unit of the SFU 160 may receive the output feature map from the array of processing elements 110 and quantizes the output feature map to a specific bit width. In addition, the quantized feature map may be stored in the on-chip memory 120. A series of operations may be sequentially performed by the controller, and the NPU scheduler 130 may be configured to control the sequence of the operations.

In this way, when selectively turning-off some function units of the SFU 160, it is possible to reduce the power consumption of the NPU 100. Meanwhile, in order to turn-off some function units, power-gating may be applied. Alternatively, clock-gating may be applied to turn-off some function units.

Figure 24:
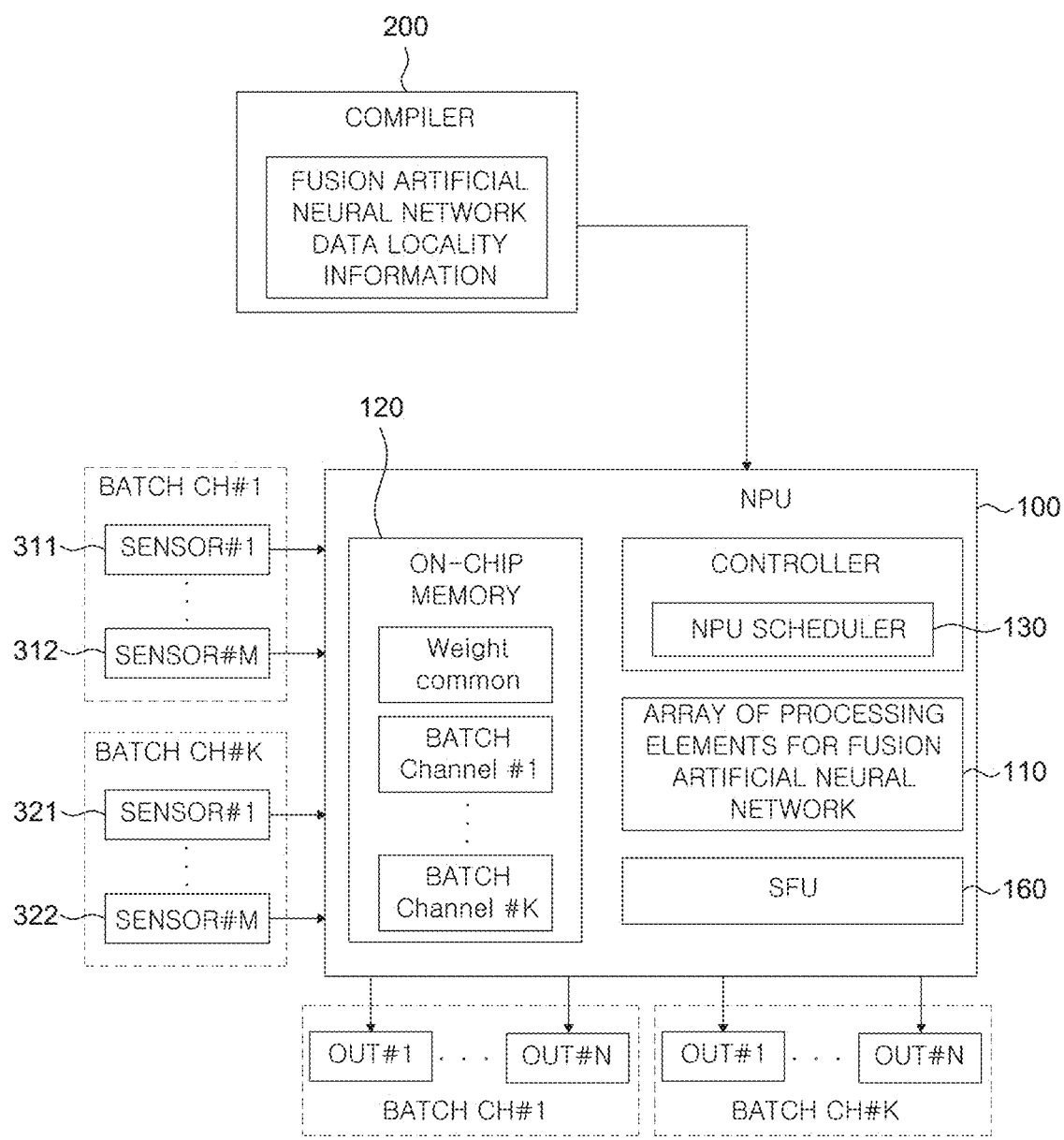
FIG. 24 is an exemplary diagram illustrating a system including an NPU architecture according to a sixth example.

FIG. 24 illustrates a system including an NPU architecture according to a sixth example.

As shown in FIG. 24, an NPU batch-mode may be applied.

The NPU 100 may include an array of processing elements 110 for a fusion ANN, an on-chip memory 120, an NPU scheduler 130, and a special function unit (SFU) 160.

The NPU scheduler 130 may be included in the controller as shown in FIG. 24.

The NPU 100 may obtain fusion ANN data locality information from the compiler 200.

The batch-mode disclosed in this example may be referred to as a mode configured to achieve low-power consumption by sequentially processing a plurality of identical sensors with one ANN model to reuse the weights of the one ANN model as much as the number of the plurality of identical sensors.

For batch-mode operation, the controller of the NPU 100 may be configured to control the NPU scheduler 130 so that the weight stored in the on-chip memory is reused as much as the number of sensors input to each batch-channel. That is, the NPU 100 may be configured to operate in a batch-mode with M sensors. In this case, the batch-mode operation of the NPU 100 may be configured to operate with a fusion ANN model.

For the operation of the fusion ANN, the NPU 100 may be configured to have a plurality of batch-channels (BATCH CH #1 to BATCH CH #K) for fusion. Each batch-channel may be configured to include the same number of the plurality of sensors. The first batch-channel BATCH CH #1 may include a plurality of first sensors. In this case, the number of first sensors may be M. The K batch-channel BATCH CH #K may include a plurality of second sensors. In this case, the number of second sensors may be M.

The NPU 100 may reuse and process a weight corresponding to the input from the sensors 311 and 312 in the on-chip memory 120 through the first batch-channel. In addition, the NPU 100 may reuse and process the weight corresponding to the input from the sensors 321 and 322 in the on-chip memory 120 through the second batch-channel.

In this way, the NPU 100 may receive inputs from various sensors through a plurality of batch-channels, reuse weights, and process the fusion ANN in a batch-mode. A sensor of at least one channel among the plurality of batch-channels and a sensor of at least one other channel may be different from each other.

The on-chip memory 120 in the NPU 100 may be configured to have a storage space corresponding to a plurality of batch-channels.

The NPU scheduler 130 in the NPU 100 may operate the array of processing elements 110 according to the batch-mode.

The SFU 160 in the NPU 100 may provide a special function for processing at least one fusion operation.

The NPU 100 may deliver each output through a plurality of batch-channels.

At least one of the pluralities of batch channels may be inferred data of a fusion ANN.

Figure 25:
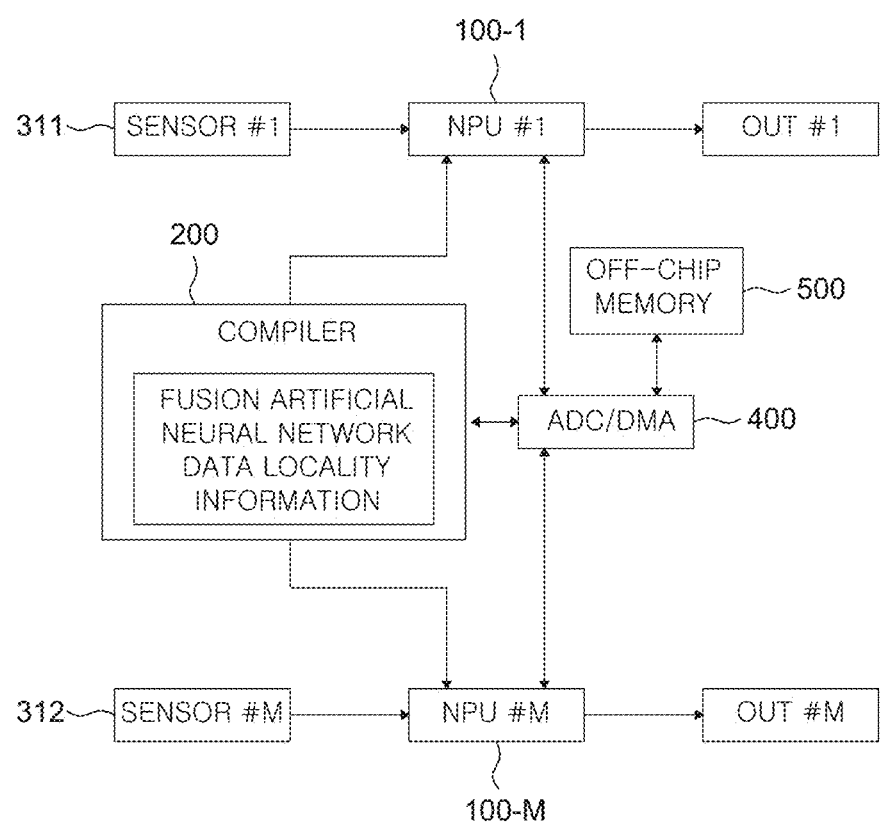
FIG. 25 is an exemplary diagram illustrating an example of utilizing a plurality of NPUs according to a seventh example.
Figure 26:
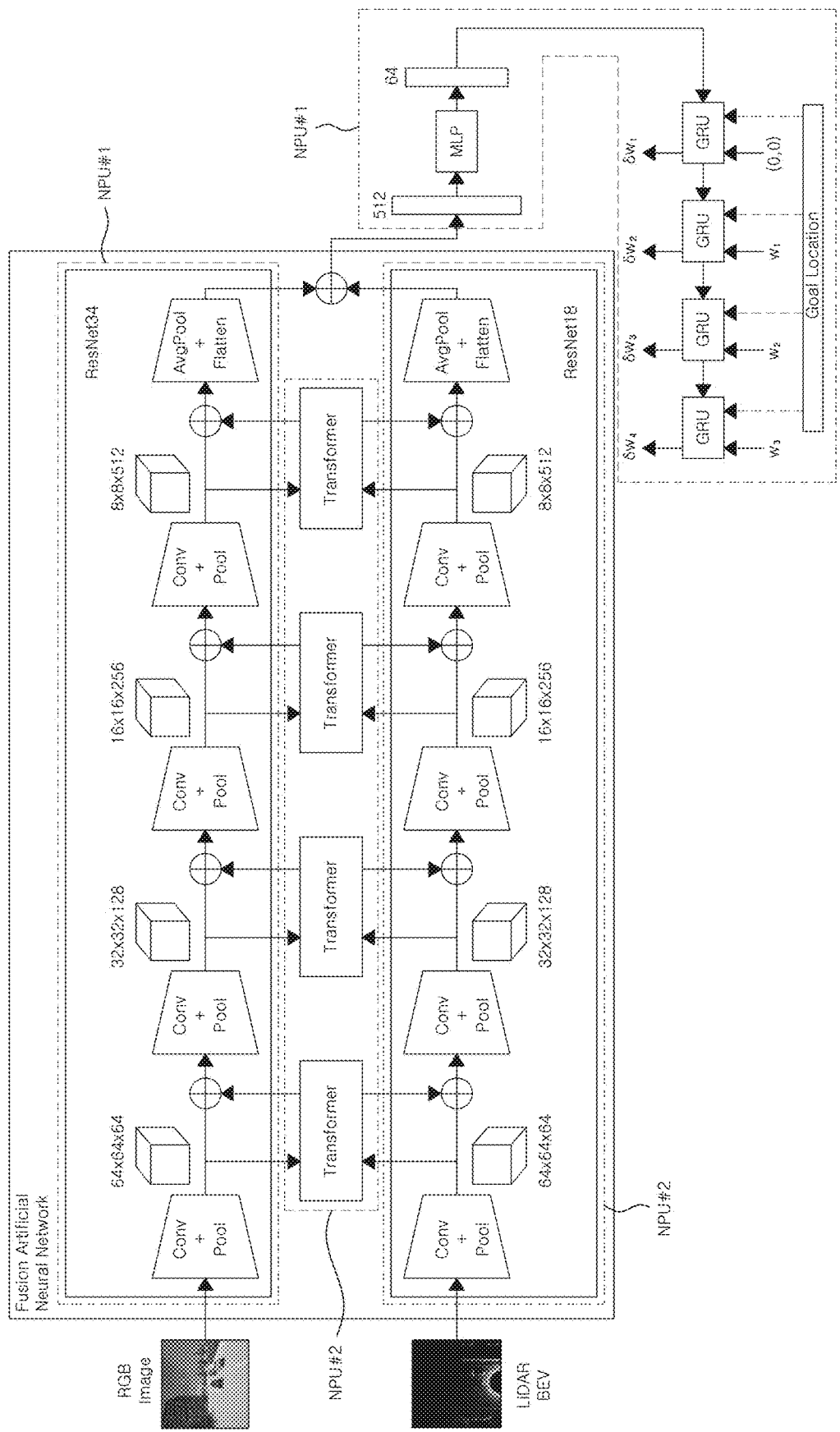
FIG. 26 is an exemplary diagram illustrating an example of processing the fusion artificial neural network shown in FIG. 13 through the plurality of NPUs shown in FIG. 25.

FIG. 25 illustrates an example of utilizing a plurality of NPUs according to a seventh example. FIG. 26 illustrates an example of processing the fusion ANN shown in FIG. 13 through a plurality of NPUs shown in FIG. 25.

As shown in FIG. 25, for example, a plurality M of NPUs may be used for autonomous driving.

Among the M NPUs, the first NPU 100-1 may process data provided from, for example, the sensor #1 311, and the Mth NPU 100-M may, for example, process data provided from the sensor #M 312 can be processed.

The plurality of NPUs (100-1, 100-2 . . . 100-M) may obtain fusion ANN data locality information from the compiler 200.

Each NPU may process a fusion ANN and transfer an operation for fusion to different NPUs through the ADC/DMA 400.

The ADC/DMA 400 may obtain data locality information for a fusion ANN from the compiler 200.

The compiler 200 may generate the ANN data locality information by dividing it into data locality information #1 to data locality information #M so that operations that need to be processed in parallel among operations according to ANN data locality information can be processed in each NPU.

The off-chip memory 500 may store data that can be shared by a plurality of NPUs, and may be transmitted to each NPU.

As shown in FIG. 26, NPU #1 may be in charge of the first ANN for processing data provided from the camera, and NPU #2 may be in charge of the second ANN for processing data provided from LiDAR. In addition, the NPU #2 may be in charge of conversion for the fusion of the first ANN and the second ANN.

Figure 27A:
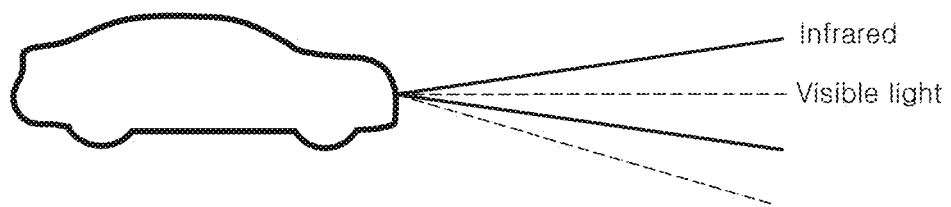
FIGS. 27A to 27C show examples of application of a fusion artificial neural network using a near-infrared (NIR) sensor and a camera.
Figure 27B:
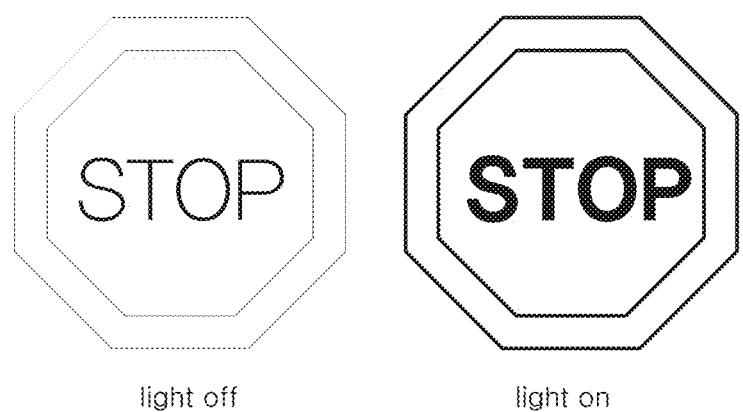
Figure 27C:
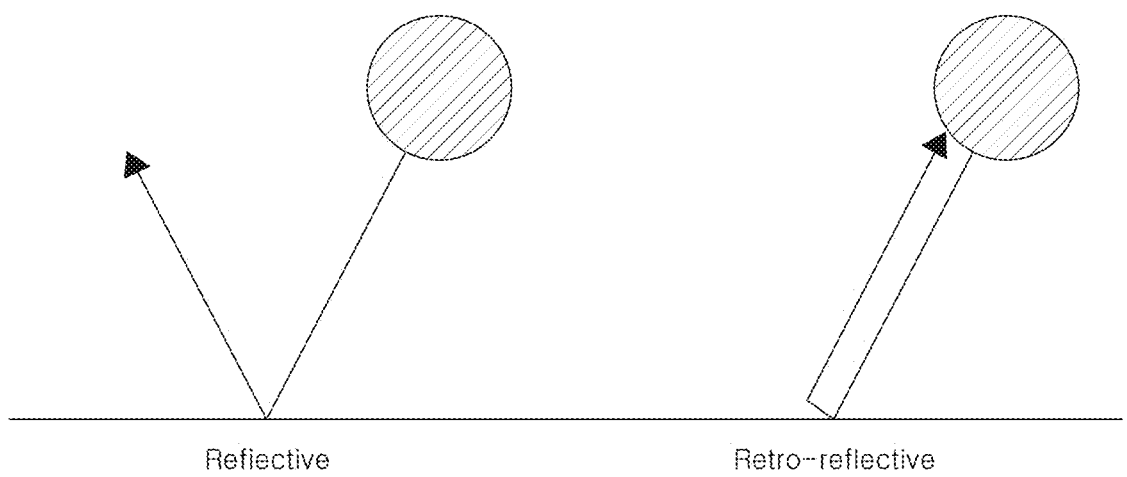

FIGS. 27A to 27C show examples of application of a fusion ANN using a near-infrared sensor and a camera.

As shown in FIG. 27A, in general, in a vehicle, a general headlight is installed to irradiate visible light at an angle less than or equal to a horizontal line. However, the inventor of the present disclosure proposes to additionally install a light source irradiating near-infrared (NIR) in the forward direction, and to install the NIR sensor in the vehicle.

A typical camera can generally sense RGB images with a wavelength of 380 nm to 680 nm. On the other hand, the NIR sensor may take an image having a wavelength of 850 nm to 940 nm.

In this way, when the NIR light source and the NIR sensor are added, a high-quality image can be obtained without obstructing the view of a driver driving an oncoming vehicle at night.

The NIR sensor may be synchronized with a corresponding NIR light source and driven according to pulse width modulation (PWM). Accordingly, power consumption and signal-to-noise ratio (SNR) can be improved.

Meanwhile, the NIR light source may be turned on or turned off every frame. As shown in FIG. 27B, when the NIR light source is turned on and off, signs having retro-reflector properties can be distinguished within the overall image. FIG. 27C shows the characteristics of retro-reflection.

By turning the NIR light source on and off as described above, it is possible to distinguish signs having retro-reflector characteristics. In other words, when the NIR light source and the NIR sensor are adjacent to each other, the amount of light reflected by the NIR light source on the retro-reflective plate may be detected to be 300 times brighter than the amount of light reflected by a general object. Therefore, when on-off, retro-reflective objects can be detected.

The NIR sensor can detect the NIR reflected light, but the general traffic light is not detected, so the fusion ANN can be trained to distinguish the light from the NIR reflected light.

As described above, by combining the RGB image and the NIR image, it is possible to enable autonomous driving at night condition.

These applications can be extended in other ways.

For example, an NIR light source may be additionally installed in a vehicle headlight, and a camera including an image sensor capable of detecting a wavelength of 380 nm to 680 nm of visible light and a wavelength of 850 nm to 940 nm of near infrared light may be installed. A fusion artificial neural network can distinguish front and rear approaching vehicles, traffic lights, obstacles, road surface conditions, and pedestrians in an image.

As another example, in order to monitor the interior of the vehicle at night, the NIR light source and the NIR sensor may be installed in the interior of the vehicle. For example, a plurality of NIR light sources may be installed at different optimal positions to capture the driver and passenger states. Through this, it is possible to monitor the health status of the driver and passengers.

Figure 28:
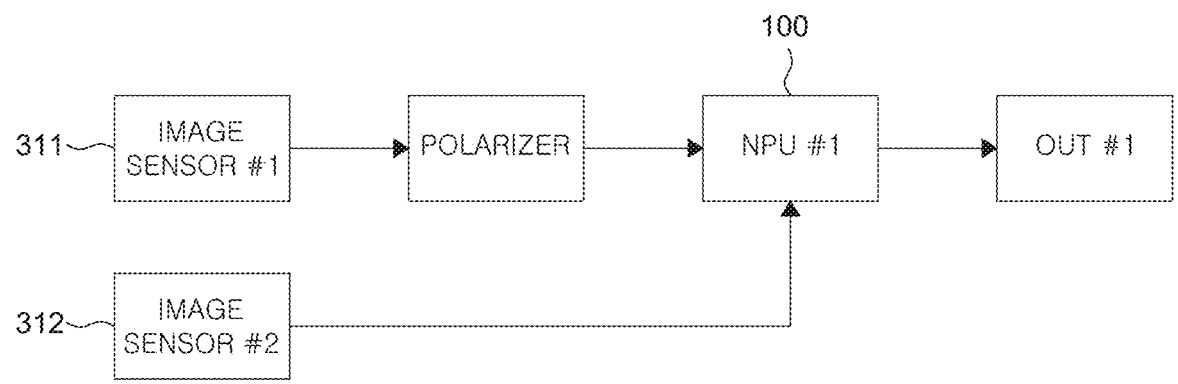
FIG. 28 shows an example of utilizing a polarizer according to an eighth example.
Figure 29A:
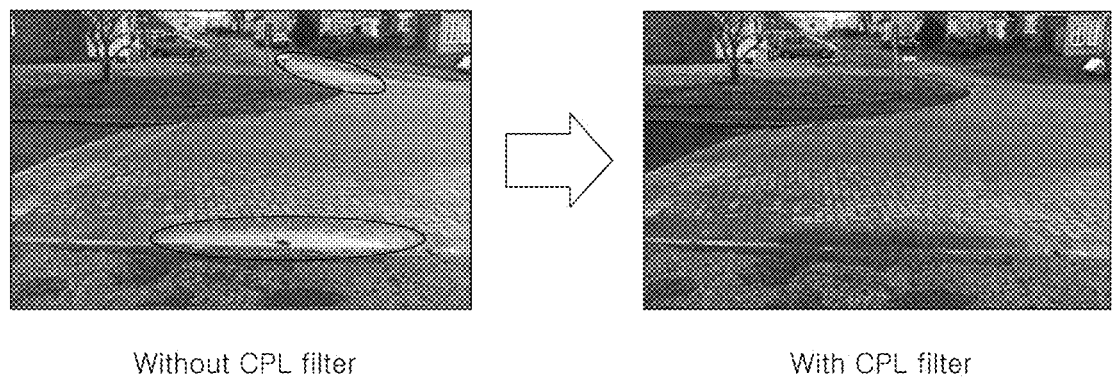
FIGS. 29A and 29B are examples illustrating the performance of the polarizer shown in FIG. 28.
Figure 29B:
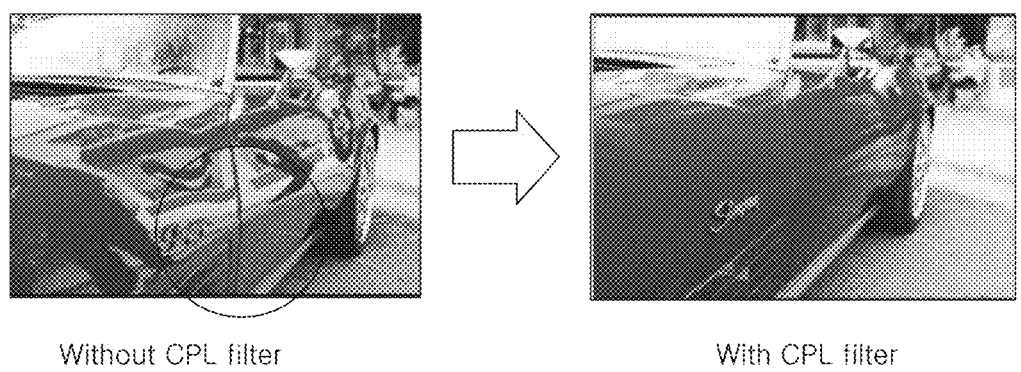

FIG. 28 shows an example of utilizing a polarizer according to an eighth example. FIGS. 29A and 29B are examples illustrating the performance of the polarizer.

As shown in FIG. 28, a polarizer is additionally connected to the image sensor #1 311, and an output from the polarizer is input to the NPU #1 100.

When a polarizer is added to the image sensor #1 311, reflection of sunlight can be reduced. As shown in FIGS. 29A and 29B, if a polarizer is used, light reflected from vehicle paint, glass, water, direct light, and the like may be filtered. However, if a polarizer is used, the brightness of the image may be darkened by 25%. Accordingly, the artificial neural network driven by the NPU 100 may be trained to compensate for the reduced brightness due to the polarizer.

In various examples of the present disclosure, in order to minimize AI operation speed and power consumption, the array of processing elements 110 may be configured as an inference-only array of processing elements. An inference-only array of processing elements can be configured to exclude the training function of an artificial neural network. That is, an inference-only array of processing elements can be configured to exclude floating-point operators. Therefore, for artificial neural network training, a separate dedicated hardware for training may be provided. For example, the array of processing elements 110 according to various examples of the present disclosure may be configured as an inference-only array of processing elements that will be configured to process 8-bit integers. According to the above-described configuration, the array of processing elements 110 has the effect of significantly reducing power consumption compared to the floating point. At this time, the SFU 160 may be configured to utilize a function unit for integer and floating-point conversion (INT to FP32) operations for some special functions requiring floating-point arithmetic.

That is, according to some examples, the array of processing elements 110 may be configured to enable only integer arithmetic, and may be configured to enable floating point arithmetic in the SFU 160.

That is, according to some examples, for efficient operation of the on-chip memory 120, the controller of the NPU 100 may control all data stored in the on-chip memory 120 from the SFU 160 to be an integer.

Simplified Summary of the Present Disclosure

According to an example of the present disclosure, a neural processing unit (NPU) may be provided. The NPU may include a controller including a scheduler, the controller configured to receive from a compiler a machine code of an artificial neural network (ANN) including a fusion ANN, the machine code including data locality information of the fusion ANN, and to receive heterogeneous sensor data from a plurality of sensors corresponding to the fusion ANN; an array of processing elements configured to perform fusion operations of the fusion ANN; a special function unit (SFU) configured to perform a special function operation of the fusion ANN; and an on-chip memory configured to store operation data of the fusion ANN. The schedular may be configured to control the array of processing elements, the SFU, and the on-chip memory such that all operations of the fusion ANN are processed in a predetermined sequence according to the data locality information.

The plurality of sensors may include at least two of a camera, a polarized camera, a 3D camera, a near-infrared camera, a thermal imaging camera, a radar, a LiDAR, and an ultrasonic sensor.

The heterogeneous sensor data may be a signal sensed concurrently from at least two of a camera, a polarized camera, a 3D camera, a near-infrared camera, a thermal imaging camera, a radar, a LiDAR, and an ultrasonic sensor.

The fusion ANN may be trained to perform an inference operation of at least one of a smart cruise control, an automatic emergency braking system, a parking steering assistance system, a lane departure warning system, a lane keeping assist system, a drowsiness detection, an alcohol detection, a heat and cold detection, a carelessness detection.

The special function operation may include at least one of a skip-connection for the fusion ANN and a concatenation for the fusion ANN.

The scheduler may be further configured to protect specific data stored in the on-chip memory up to a specific operation stage of the fusion ANN based on the data locality information.

The fusion ANN may be trained to process an inference operation of at least one of classification, semantic segmentation, object detection, and prediction, and the array of processing elements may be further configured to output at least one inference result of the fusion ANN.

The array of processing elements may include a plurality of threads, and the controller may be configured to control the plurality of threads to process a parallel section of the fusion ANN based on the data locality information.

According to another example of the present disclosure, an NPU is provided. The NPU may include a controller configured to receive a machine code of an artificial neural network (ANN) including a fusion ANN, the machine code including data locality information of the fusion ANN; an array of processing elements configured to perform computation of the fusion ANN based on the machine code; and a special function unit (SFU) including a plurality of function units, the SFU configured to compute a special function corresponding to one of the plurality of function units by receiving a convolution operation value processed by the array of processing elements, and to selectively control at least one of the plurality of function units according to the data locality information.

The plurality of function units may be configured in a pipeline structure, may be configured to be selectively activated by the controller, or may be configured to be selectively deactivated by the controller. Each of the plurality of function units may be configured to be selectively clock-gated and/or power-gated for each specific operation by the controller.

The NPU may further include an on-chip memory configured to store computation data of the fusion ANN, and the controller may be further configured to receive heterogeneous sensor data from a plurality of sensors corresponding to the fusion ANN.

The NPU may further include a batch input unit configured to receive a plurality of input signals corresponding to the fusion ANN in a batch-mode; and an on-chip memory configured to store computation data of the fusion ANN in the batch-mode. The fusion ANN may be trained to process an inference operation of at least one of classification, semantic segmentation, object detection, and prediction, and, in the batch mode, the array of processing elements may be further configured to output at least one inference result of the fusion ANN.

According to another example of the present disclosure, a system may be provided. The system may include at least one neural processing unit including a controller configured to receive a machine code of an artificial neural network (ANN) including a fusion ANN, the machine code including data locality information of the fusion ANN, an input unit configured to receive at least two input signals, an array of processing elements configured to perform a convolution operation, and an on-chip memory configured to store a result of the convolution operation; and a memory controller including a memory, the memory controller configured to receive the data locality information of the fusion ANN for predicting successive memory operation requests of the at least one neural processing unit, and cache a next memory operation request to be requested by a corresponding one of the at least one neural processing unit based on the data locality information.

The at least one neural processing unit may include a plurality of processing units. In this case, each of the at least one neural processing unit may be configured to process, in parallel, the machine code input to the controller of each of the plurality of processing units; the memory controller may be further configured to directly control a parallel processing of the plurality of neural processing units; and the machine code may be compiled for parallel processing in the plurality of neural processing units.

The system may further include an infrared light source; and a visible light source. The input unit may be further configured to receive an infrared image from the infrared light source and to receive a visible light image from the visible light source, and the machine code may be compiled for the fusion ANN, the fusion ANN configured to fuse the visible light image and the infrared image. The infrared light source may be configured to be PWM driven, and the infrared image may be synchronized with the infrared light source. An irradiation angle of the infrared light source and an irradiation angle of the visible light source may be configured to partially overlap each other.

The examples illustrated in the specification and the drawings are merely provided to facilitate the description of the subject matter of the present disclosure and to provide specific examples to aid the understanding of the present disclosure and it is not intended to limit the scope of the present disclosure. It is apparent to those of ordinary skill in the art to which the present disclosure pertains in which other modifications based on the technical spirit of the present disclosure can be implemented in addition to the examples disclosed herein.

[National R&D Project Supporting This Invention]
[Project Identification Number] 1711126457
[Task Number] 2020-0-00364-002
[Name of Ministry] Ministry of Science and ICT

[Name of Task Management (Specialized) Institution] Institute of Information & Communications Technology Planning & Evaluation
[Research Project Title] Development of Semiconductor Technology Applicable for Artificial Intelligence
[Research Task Name] Development of NPU and Application System for Enhancing Communication Technology for Vehicles based on Artificial Intelligence (AI)
[Contribution rate] 1/1
[Name of the organization performing the task] DeepX Co., Ltd.
[Research Period] 2021 Jan. 1~2021 Dec. 31

What is claimed is:

1. A neural processing unit (NPU) comprising:
a controller including a scheduler, the controller configured to
receive from a compiler a machine code of an artificial neural network (ANN) including a fusion ANN, the machine code including data locality information of the fusion ANN, and
receive heterogeneous sensor data from a plurality of sensors corresponding to the fusion ANN;
at least one processing element configured to perform fusion operations of the fusion ANN including a convolution operation and at least one special function operation; and
an on-chip memory configured to store operation data of the fusion ANN,
wherein the scheduler is configured to control the at least one processing element, and the on-chip memory is configured such that all operations of the fusion ANN are processed in a predetermined sequence according to the data locality information.

2. The NPU of claim 1, wherein the plurality of sensors includes at least two of a camera, a polarized camera, a 3D camera, a near-infrared camera, a thermal imaging camera, a radar, a light detection and ranging (LiDAR) sensor, and an ultrasonic sensor.

3. The NPU of claim 1, wherein the heterogeneous sensor data is a signal sensed concurrently from at least two of a camera, a polarized camera, a 3D camera, a near-infrared camera, a thermal imaging camera, a radar, a light detection and ranging (LiDAR) sensor, and an ultrasonic sensor.

4. The NPU of claim 1, wherein the fusion ANN is trained to perform an inference operation of at least one of a smart cruise control, an automatic emergency braking system, a parking steering assistance system, a lane departure warning system, a lane keeping assist system, a drowsiness detection, an alcohol detection, a heat and cold detection, and a carelessness detection.

5. The NPU of claim 1, wherein the at least one special function operation includes at least one of a skip-connection for the fusion ANN and a concatenation for the fusion ANN.

6. The NPU of claim 1, wherein the scheduler is further configured to protect specific data stored in the on-chip memory up to a specific operation stage of the fusion ANN based on the data locality information.

7. The NPU of claim 1,
wherein the fusion ANN is trained to process an inference operation of at least one of classification, semantic segmentation, object detection, and prediction, and
wherein the at least one processing element is further configured to output at least one inference result of the fusion ANN.

8. The NPU of claim 1,
wherein the at least one processing element includes a plurality of threads, and
wherein the controller is configured to control the plurality of threads to process a parallel section of the fusion ANN based on the data locality information.

9. A neural processing unit (NPU) comprising:
a controller configured to receive a machine code of an artificial neural network (ANN) including a fusion ANN, the machine code including data locality information of the fusion ANN;
at least one processing element configured to perform computation of the fusion ANN based on the machine code; and
a special function unit (SFU) including a plurality of function units, the SFU configured to
compute a special function corresponding to one of the pluralities of function units by receiving a convolution operation value processed by the at least one processing element, and
selectively control at least one of the pluralities of function units according to the data locality information.

10. The NPU of claim 9, wherein the plurality of function units is configured in a pipeline structure.

11. The NPU of claim 9, wherein the plurality of function units is configured to be selectively activated by the controller.

12. The NPU of claim 9, wherein the plurality of function units is configured to be selectively deactivated by the controller.

13. The NPU of claim 9, wherein each of the plurality of function units is configured to be selectively clock-gated and/or power-gated for each specific operation by the controller.

14. The NPU of claim 9, further comprising an on-chip memory configured to store computation data of the fusion ANN,
wherein the controller is further configured to receive heterogeneous sensor data from a plurality of sensors corresponding to the fusion ANN.

15. The NPU of claim 9, further comprising:
a batch input unit configured to receive a plurality of input signals corresponding to the fusion ANN in a batch-mode; and
an on-chip memory configured to store computation data of the fusion ANN in the batch-mode,
wherein the fusion ANN is trained to process an inference operation of at least one of classification, semantic segmentation, object detection, and prediction, and
wherein, in the batch mode, the at least one processing element is further configured to output at least one inference result of the fusion ANN.

16. A system comprising:
at least one neural processing unit including
a controller configured to receive a machine code of an artificial neural network (ANN) including a fusion ANN, the machine code including data locality information of the fusion ANN,
an input unit configured to receive at least two input signals,
at least one processing element configured to perform a convolution operation, and
an on-chip memory configured to store a result of the convolution operation; and
a memory controller configured to
receive the data locality information of the fusion ANN for predicting successive memory operation requests of the at least one neural processing unit, and cache a next memory operation request to be requested by a corresponding one of the at least one neural processing unit based on the data locality information.

17. The system of claim 16,
wherein the at least one neural processing unit includes a plurality of processing units, and
wherein each of the at least one neural processing unit is configured to process, in parallel, the machine code input to the controller of each of the plurality of processing units.

18. The system of claim 16,
wherein the at least one neural processing unit includes a plurality of processing units, and
wherein the memory controller is further configured to directly control a parallel processing of the plurality of neural processing units.

19. The system of claim 16,
wherein the at least one neural processing unit includes a plurality of processing units, and
wherein the machine code is compiled for parallel processing in the plurality of neural processing units.

20. The system of claim 16, further comprising:
an infrared light source; and
a visible light source,
wherein the input unit is further configured to receive an infrared image from the infrared light source and to receive a visible light image from the visible light source, and
wherein the machine code is compiled for the fusion ANN, the fusion ANN configured to fuse the visible light image and the infrared image.

21. The system of claim 20, wherein the infrared light source is configured to be pulse width modulation (PWM) driven, and wherein the infrared image is synchronized with the infrared light source.

22. The system of claim 20, wherein an irradiation angle of the infrared light source and an irradiation angle of the visible light source are configured to partially overlap each other.

* * * * *